(12) United States Patent
Kono et al.

(10) Patent No.: US 11,374,487 B2
(45) Date of Patent: Jun. 28, 2022

(54) POWER SOURCE QUALITY MANAGEMENT SYSTEM AND AIR CONDITIONER

(71) Applicant: DAIKIN INDUSTRIES, LTD., Osaka (JP)

(72) Inventors: Masaki Kono, Osaka (JP); Reiji Kawashima, Osaka (JP); Takayuki Fujita, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 415 days.

(21) Appl. No.: 16/614,861

(22) PCT Filed: May 30, 2018

(86) PCT No.: PCT/JP2018/020854
§ 371 (c)(1),
(2) Date: Nov. 19, 2019

(87) PCT Pub. No.: WO2018/221624
PCT Pub. Date: Dec. 6, 2018

(65) Prior Publication Data
US 2021/0159781 A1 May 27, 2021

(30) Foreign Application Priority Data
May 30, 2017 (JP) .............................. JP2017-106823

(51) Int. Cl.
*B63H 23/24* (2006.01)
*H02M 1/42* (2007.01)
(Continued)

(52) U.S. Cl.
CPC ........... *H02M 1/4208* (2013.01); *F24F 11/46* (2018.01); *F24F 11/88* (2018.01); *H02M 1/44* (2013.01); *H02M 5/04* (2013.01)

(58) Field of Classification Search
CPC ........ H02M 1/4208; H02M 5/04; H02M 5/22; H02M 1/44; H02M 1/12; H02M 1/42;
(Continued)

(56) References Cited

U.S. PATENT DOCUMENTS 9,654,028 B1 * 5/2017 Luo .................. H02M 7/537
2004/0090214 A1 * 5/2004 Chou ..................... G05F 1/70
323/207
(Continued)

FOREIGN PATENT DOCUMENTS

CN 101174794 A 5/2008
CN 103715690 A 4/2014
(Continued)

OTHER PUBLICATIONS

International Search Report, issued in PCT/JP2018/020854, dated Jul. 3, 2018.
(Continued)

*Primary Examiner* — Jared Fureman
*Assistant Examiner* — Esayas G Yeshaw
(74) *Attorney, Agent, or Firm* — Birch, Stewart, Kolasch & Birch, LLP

(57) ABSTRACT

A controller performs a first control for controlling the power source power factor or a power source harmonic of the harmonic current such that an input power factor of at least one of a plurality of connection devices changes in a direction preceding the power source power factor in a case where the power source power factor changes in a lagging direction, and performs a second control for controlling the power source power factor or the power source harmonic such that the input power factor of at least one of the connection devices changes in a direction lagging behind the power source power factor in a case where the power source power factor changes in a leading direction.

18 Claims, 20 Drawing Sheets

(51) Int. Cl.
*F24F 11/88* (2018.01)
*F24F 11/46* (2018.01)
*H02M 1/44* (2007.01)
*H02M 5/04* (2006.01)

(58) Field of Classification Search
CPC . F24F 11/88; F24F 11/46; Y02B 70/10; H02J 3/1842; H02J 3/1892; Y02E 40/20; G05F 1/70
See application file for complete search history.

(56) References Cited

U.S. PATENT DOCUMENTS

| | | | |
|---|---|---|---|
| 2013/0043847 A1* | 2/2013 | Kim | H02M 1/4225 323/205 |
| 2013/0051105 A1* | 2/2013 | Wang | H02M 1/42 363/132 |
| 2013/0200691 A1* | 8/2013 | Crane | B63H 23/24 307/9.1 |
| 2019/0238046 A1 | 8/2019 | Kawashima et al. | |
| 2019/0252881 A1* | 8/2019 | Kono | H02M 1/12 |
| 2021/0010707 A1* | 1/2021 | Takahashi | H02J 3/1892 |

FOREIGN PATENT DOCUMENTS

| | | |
|---|---|---|
| EP | 1919064 A2 | 5/2008 |
| EP | 1919064 A3 | 3/2010 |
| EP | 1919064 B1 | 8/2017 |
| EP | 1919064 B8 | 3/2018 |
| JP | 4-96626 A | 3/1992 |
| JP | 2000-224769 A | 8/2000 |
| JP | 2002-354844 A | 12/2002 |
| JP | 2016-116330 A | 6/2016 |
| JP | 6299831 B1 | 3/2018 |
| WO | WO 2012/047578 A2 | 4/2012 |
| WO | WO 2012/047578 A3 | 4/2012 |
| WO | WO 2017/037892 A1 | 3/2017 |

OTHER PUBLICATIONS

Chinese Search Report, dated Jun. 4, 2020, for Chinese Application No. 2018800356775.
Extended European Search Report, dated Aug. 24, 2020, for European Application No. 18808873.6.
Xu et al., "A Compensation Strategy for a Parallel System of Active Power Filter Modules Based on a Real-time Current Sharing Control," Power System Automation, vol. 39, No. 16, 2015 (Aug. 25, 2015), pp. 95-102 (12 pages total), with a partial English translation.

\* cited by examiner

OPERATION EXAMPLE FOR CORRECTING LAGGING POWER FACTOR

POWER SOURCE QUALITY MANAGEMENT SYSTEM AND AIR CONDITIONER

TECHNICAL FIELD

The present invention relates to a power source quality management system and an air conditioner.

BACKGROUND ART

As exemplarily shown in Patent Document 1, an air conditioner may include an active filter device for preventing harmonic current from flowing to an electric power system (for example, an electric power system including a commercial power source).

CITATION LIST

Patent Document

Patent Document 1: Japanese Unexamined Patent Publication No. 2016-116330

SUMMARY OF THE INVENTION

Technical Problem

In a case of an electric power system to which an air conditioner is connected, a load other than the air conditioner may also be connected to the electric power system. Examples of the load may be devices having an inverter circuit etc., such as an elevator. In this case, the load other than the air conditioner may be a source to generate a harmonic current. In such case, it is not sufficient to take a mere countermeasure against a harmonic current in the air conditioner. Improvement in power source quality is desirable as to, for example, a countermeasure against harmonic current for the whole system including the above load and the air conditioner. In view of the reduction in size of facility capacity, energy saving etc., further improvement to the power source quality is also desirable, for example, improvement to fundamental power factor for the above whole system.

In view of the foregoing, it is therefore an object of the present invention to improve power source quality in the whole system in which a plurality of devices acting as generation sources of harmonic current is connected to a power source.

Solution to the Problem

According to a first aspect of the present disclosure, there is provided a power source quality management system, comprising: a load device (3) that is connected to a power source (4) and supplied with a power source electric power from the power source (4); a plurality of connection devices (41,42), each including a harmonic generation device (1,2) that is parallelly connected to the load device (3) with respect to the power source (4) and supplied with the power source electric power from the power source (4), and a current source (30) whose output is parallelly connected to the harmonic generation device (1,2) with respect to the power source (4); and a controller (43,47,52,62) configured to control a harmonic current flowing in a receiving channel (13) from the power source (4) to the load device (3) and the harmonic generation devices (1,2) or to control a power source power factor of the power source (4), the controller (43,47,52,62) being configured to: perform a first control for controlling the power source power factor or a power source harmonic of the harmonic current such that an input power factor of at least one of the connection devices (41,42) changes in a direction preceding the power source power factor in a case where the power source power factor changes in a lagging direction, and perform a second control for controlling the power source power factor or the power source harmonic such that the input power factor of at least one of the connection devices (41,42) changes in a direction lagging behind the power source power factor in a case where the power source power factor changes in the leading direction.

In this way, in the power source quality management system including the connection devices (41,42) with the current source (30) and the harmonic generation devices (1,2) as well as the load device (3) other than the connection devices (41,42), change in input current of at least one of the connection devices (41,42) can allow for improvement in power source quality of the system as a whole.

A second aspect is an embodiment of the first aspect. In the second aspect, the current source (30) includes a plurality of current sources (30), the current source (30) is able to generate a compensation current for performing at least one of reduction in harmonic current and improvement in a fundamental power factor of a corresponding one of the harmonic generation devices (1,2) and the load device (3), a calculation unit (90) is further included, wherein, at a time of the first control and the second control performed by the controller (43,47), to make a sum of the harmonic current generated in the plurality of the harmonic generation devices (1,2) and the in the load device (3) distributed among and compensated by the current sources (30) and make a compensation amount of each of the current sources (30) meet the condition of less than a maximum output capacity of the current source (30), the calculation unit (90) calculates an amount of the compensation current corresponding to the compensation amount to be generated by the corresponding one of the current sources (30), and the controller (43,47) performs, based on a calculation result of the calculation unit (90), the first control and the second control.

In the above first and second controls, the sum of harmonic currents generated in the harmonic generation devices (1,2) and the load device (3) is distributed to and compensated by the current sources (30). The compensation amount is determined not to exceed the maximum output capacity of the respective current sources (30). In this way, in the case in which there are a plurality of harmonic generation devices for which the compensation is to be performed, it is possible to achieve power source quality improvement (reduction in harmonic current and improvement to fundamental current) in a state in which the respective current sources (30) are effectively utilized without any excessive load to at least part of the current sources (30).

A third aspect is an embodiment of the second aspect. In the third aspect, the calculation unit (90) calculates a first compensation amount, based on which each of the current sources (30) compensates the harmonic current generated in part of the harmonic generation devices (1,2) and the load device (3), calculates a surplus amount for each of the current sources (30), the surplus amount being a difference between the maximum output capacity and the first compensation amount, and calculates the compensation current of each of the current sources (30) in accordance with the surplus amount.

In this case, the compensation current of each of the current sources (30) is determined in accordance with a surplus amount. The surplus amount is a difference between the first compensation amount already compensated by each of the current sources (30) and the maximum output capacity of the current source (30). In this way, the compensation current is determined to meet the condition, i.e., surely not to exceed the maximum output capacity.

A fourth aspect is an embodiment of the third aspect. In the third aspect, the calculation unit (90) calculates the compensation current of each of the current sources (30) such that a second compensation amount increases as the surplus amount increases, the second compensation amount being used for making a sum of the harmonic current generated in a rest of the harmonic generation devices (1,2) and the load device (3) except for the part of the harmonic generation devices (1,2) and the load device (3) distributed and compensated.

In this way, the compensation amounts of the respective current sources (30) are averaged as much as possible. Hence, the risk of excessive load to any given current sources (30) can be reduced.

A fifth aspect is an embodiment of the fourth aspect. In the fifth aspect, the maximum output capacity is a maximum compensation current value indicating a maximum value of a current that can be generated by the current source (30), and the calculation unit (90) calculates the surplus amount through subtraction of a current value of a first compensation corresponding to the first compensation amount from the maximum compensation current value.

In this case, the surplus amount is calculated by using the maximum compensation current value that can be output by each of the current sources (30) as the maximum output capacity.

A sixth aspect is an embodiment of the fourth aspect. In the sixth aspect, the maximum output capacity is a maximum compensation electric power value indicating a maximum value of an electric power that can be generated by the current source (30), and the calculation unit (90) calculates the surplus amount through subtraction of an electric power value of a first compensation corresponding to the first compensation amount from the maximum compensation electric power value.

In this case, the surplus amount is calculated by using the maximum compensation electric power value that can be output by each of the current sources (30) as the maximum output capacity. The electric power is equal to the product of the current and the voltage. Hence, the surplus amount is obtained from the electric power, thereby making it possible to calculate the amount of the compensation current flexibly in accordance with various combination patterns of the currents and the voltages without paying particular attention to the respective values of the current and the voltage. This results in relatively easier designing of the active filter devices (5,6).

A seventh aspect of the present disclosure is an embodiment of any one of the second to sixth aspects. In the seventh aspect, the power source (4) is an AC power source, and at least one of the harmonic generation devices (1,2) is a power converter that is supplied with an electric power from the power source (4).

An eighth aspect of the present disclosure is included in the power source quality management system of any one of the second to seventh aspects. In the seventh aspect, there is provided an active filter device (5) included in the power source quality management system of any one of second to seventh aspects, the active filter device (5) being connected to the load device (3) and the harmonic generation device (1), comprising the current source (30); and the controller (47) in which the calculation unit (90) is integrated.

A ninth aspect of the present disclosure is an air conditioner including the active filter device (5) of the eighth aspect.

A tenth aspect is an embodiment of the first aspect. In the tenth aspect, in the power source quality management system, the plurality of connection devices (41,42) are respectively included in air conditioners (11,12), and the controller (52,62) performs, in the first control and the second control, based on the harmonic current or the power source power factor, change of the input power factor or an input harmonic of the first air conditioner (11) that is a part of the air conditioners (11,12) to reduce the harmonic current or to make improvement through increase or decrease of the power source power factor, then changes an input power factor or an input harmonic of the second air conditioner (12) that is a rest of the air conditioners (11,12) except for the first air conditioner (11), to perform a power source quality improvement control for controlling the power source power factor or the power source harmonic.

In this case, in the first and the second controls, power source quality improvement control is performed. In the power source quality improvement control, after change of the input power factor or the input harmonic of the first air conditioner (11), the input power factor or the input harmonic of the second air conditioner (12) is changed. In this way, the power source quality improvement for the power source quality improvement system as a whole can be achieved.

An eleventh aspect is an embodiment of the tenth aspect. In the eleventh aspect, the power source quality management system further comprises: a target setting unit (527) configured to set a target value of the harmonic current or of the power source power factor, wherein the controller (52) changes, at the power source quality improvement control, the harmonic current or the power source power factor to be close to the target value.

In this way, the power source quality improvement for the power source quality improvement system as a whole can be surely achieved.

A twelfth aspect is an embodiment of the eleventh aspect. In the eleventh aspect, the target value is set to fall within a range of 0.9950 to 1.0049.

A thirteenth aspect of the present disclosure is an embodiment of any one of the tenth to twelfth aspects. In the thirteenth aspect, each of the air conditioners (11,12) includes a power converter that is the harmonic generation device (1,2), and an active filter device (5,6) that includes the current source (30) and is connected to the power converter.

The air conditioners (1,2) include the respective power converters that are generation sources of a harmonic current and the respective active filter devices (5,6) for improving the power source quality. Though the power source quality management system includes a harmonic generation device (3) other than the power converters, the power source quality improvement control allows for improvement in the power source quality of the power source quality management system as a whole.

A fourteenth aspect is an embodiment of the thirteenth aspect. In the fourteenth aspect, the controller (52) stops, at the power source quality improvement control of the second control, an operation of the active filter device (5) included in the first air conditioner (11).

When the operation of the active filter device (5) is stopped, the power source quality improvement control is accordingly not performed, resulting in drop of the power source power factor. When the power source power factor of the AC power source (4) changes in the leading direction, the power source power factor decreases and is thus improved through stop of the operation of the active filter device (5) in the second control.

A fifteenth aspect is an embodiment of the fourteenth aspect. In the fifteenth aspect, the controller (52) stops, at the power source quality improvement control of the second control, an operation of the active filter device (6) included in the second air conditioner (12) when the power source power factor after the stop of the active filter device (5) included in the first air conditioner (11) still changes in a leading direction.

When the power source power factor after the stop of the active filter device (5) still changes in the leading direction, the power source factor can be further decreased and improved through additionally stopping the operation of the active filter device (6) in the second control.

A sixteenth aspect of the present disclosure is an embodiment of any one of the thirteenth to fifteenth aspects. In the sixteenth aspect, the controller (52) is integrated in the active filter device (5) included in the first air conditioner (11).

In this case, the controller (52) that plays a commanding role of the power source quality improvement control is included in the air conditioner (11) in which also the active filter device (5) is included that stops its operation in advance.

A seventeenth aspect of the present disclosure is an embodiment of any one of the tenth to sixteenth aspects. In the seventeenth aspect, the load device (3) is a phase modifier including a capacitor (32a to 32c) and a reactor (31a to 31c).

When the phase modifier is included, the power source power factor is likely to change in the leading direction. In this case, through the power source quality improvement control in the second control, the power source power factor changes in the lagging direction, resulting in improvement in the power source quality.

An eighteenth aspect of the present disclosure is an embodiment of any one of the tenth to seventeenth aspects. In the eighteenth aspect, a power factor detection unit (70) that is connected between the power source (4) and the air conditioner (11,12) and configured to detect the power source power factor.

The power source quality improvement control with higher accuracy can be performed in accordance with the real power source power factors.

Advantages of the Invention

According to the aspects of the present disclosure, in the power source quality management system including the connection devices (41,42) with the current source (30) and the harmonic generation devices (1,2) as well as the load device (3) other than the connection devices (41,42), a change in an input current of at least one of the connection devices (41,42) allows for improvement in power source the quality of the system as a whole.

DESCRIPTION OF EMBODIMENTS

Embodiments of the present invention will be described in detail below with reference to the drawings. The embodiments below are merely exemplary ones in nature, and are not intended to limit the scope, applications, or use of the present invention.

<<Overall System>>

Figure 1:
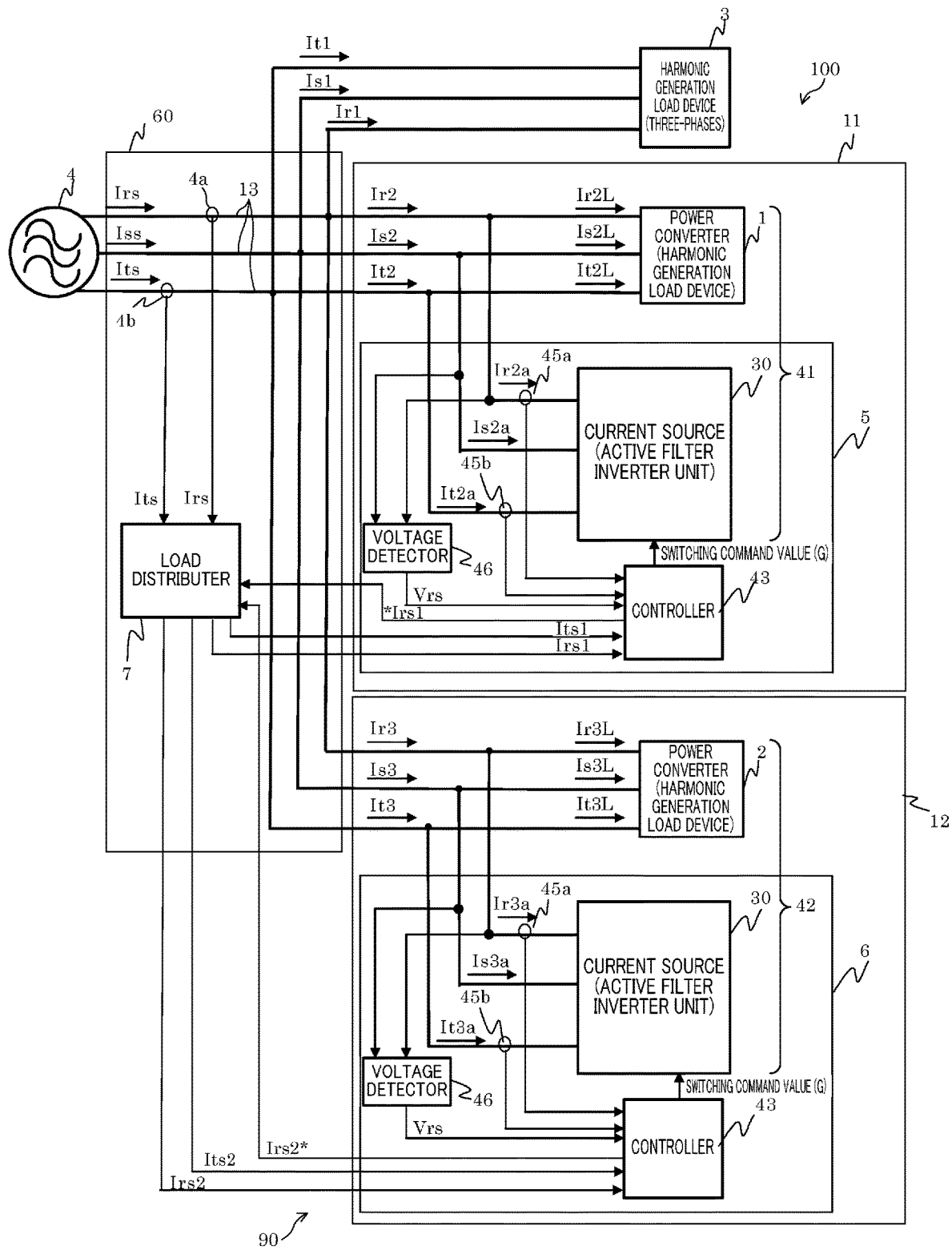
FIG. 1 shows a block diagram schematically illustrating an overall system and an air conditioning system of a first embodiment.

FIG. 1 shows a block diagram illustrating a configuration of an air-conditioning system (100) corresponding to a power source quality management system. The air-conditioning system (100) is installed in a building, a house etc. (hereinafter, referred to as "building etc."), and mainly composed of a harmonic generation load device (3) as a load device, a plurality of connection devices (41, 42) including power converters (1,2) that are harmonic generation load devices other than current sources (30) and the load device (3), and controllers (43).

One of the power converters (1,2), one of the current sources (30) (that is, one of the connection devices (41,42)), and one of the controllers (43) are included in a single air conditioner (11, 12). In other words, the air-conditioning system (100) of FIG. 1 includes a single harmonic generation load device (3) and two or more air conditioners (11, 12).

Electric power is supplied to the building etc. from an electric power system including an AC power source (4). The AC power source (4) is a three-phase AC power source (for example, a three-phase commercial power source), is connected to the harmonic generation load device (3) and each of the air conditioners (11, 12), and diverges and supplies electric power.

Specifically, the harmonic generation load device (3) operates through supply of power source electric power from the AC power source (4). The power converters (1,2) included in the respective connection devices (41, 42) are parallelly connected to the harmonic generation load device (3) with respect to the AC power source (4), and operate through supply of power source electric power from the AC power source (4). Each of the current sources (30) is connected in parallel to a corresponding one of the power converters (1, 2) with respect to the AC power source (4).

Hence, in the air-conditioning system (100), a harmonic current may flow to the AC power source (4) via receiving channels (13) not only from the power converters (1,2) but also from the harmonic generation load device (3).

Each of the current sources (30) is an active filter inverter unit, and constitutes one element of the corresponding one of active filter devices (5,6) together with the corresponding one of the controllers (43).

Each of the controllers (43) is connected to the corresponding one of current sources (30). The operational control of the corresponding current source (30) etc. allows for control of a harmonic current flowing in the receiving channels (13) from the AC power source (4) to the harmonic generation load device (3) and the plurality of power converters (1,2), or for control of a power source power factor of the AC power source (4).

As described above, various devices such as the plurality of devices (1 to 3) generating a harmonic may be connected to the AC power source (4) in accordance with the conditions of installation. In every condition, improvement of the power source power factor for the air-conditioning system (100) as a whole is desirable. On the contrary, the following case aims to achieve improvement in the power source power factor for the system (100) as a whole, even though improvement in the power factors of the respective connection devices (41,42) is less likely to be recognizable.

Figure 2:
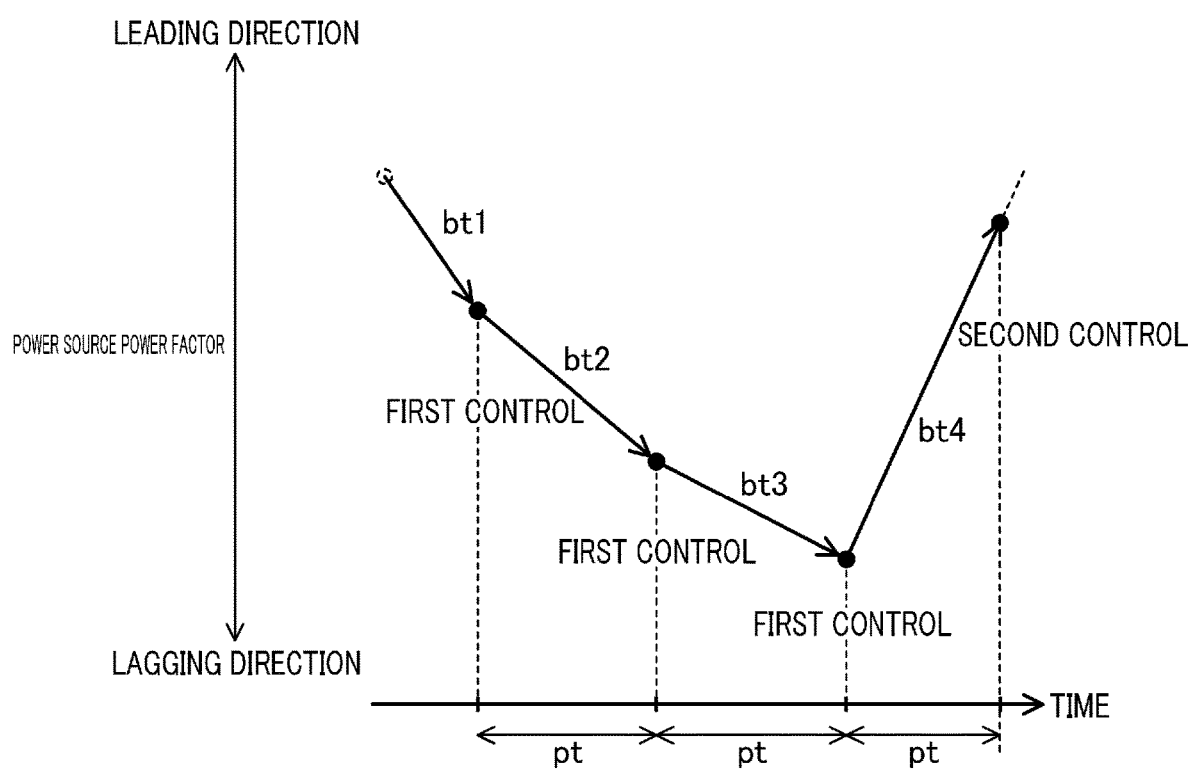
FIG. 2 shows a graph illustrating a first control and a second control in accordance with a change in a direction of a power source power factor in the overall system schematically shown.

To achieve the above object, as shown in FIG. 2, the controllers (43) check the power source power factors, for example, at a predetermined time interval (pt), and determine the state of change in the power source power factors based on the present values of the power source power factors and the previously checked values of the power source power factors. Specifically, the controllers (43) determine whether the present power source power factors change in the lagging direction or in the leading direction with respect to the previous power source power factors. When the power source power factors change in the lagging direction (bt1, bt2, bt3), the controllers (43) perform a first control. On the contrary, when the power source power factors change in the leading direction (bt4), the controllers (43) perform a second control.

The first control is as follows: to make an input power factor of at least one of the plurality of connection devices (41,42) change in the leading direction with respect to the power source power factors, the power source power factors are directly adjusted or indirectly adjusted through adjustment of a power source harmonic of a harmonic current.

The second control is as follows: To make the input power factor of at least one of the plurality of connection devices (41,42) change in the lagging direction with respect to the power source power factors, the power source power factors are directly adjusted or indirectly adjusted through adjustment of a harmonic current.

That is, in accordance with environmental situation or power source condition under which the air-conditioning system (100) is built, the power source power factors may change in the leading direction and in the lagging direction. To cope with occasional change in the power source power factors, the first and the second controls are performed to change the input power factors of the connection devices (41, 42) in the direction opposite to the direction of the respective change (i.e., the direction compensating the change).

For example, when the power source power factors are changing constantly in the lagging direction, the first control is always performed. When the power source power factors are changing constantly in the leading direction, the second control is always performed. For example, the first control was performed since the power source power factors had been changing constantly in the lagging direction at the time of the previous check. When the power source power factors have been changed in the leading direction at the time of next check, the control mode is switched to the second control.

It is difficult to guarantee that the power factors of the single connection devices (41,42) alone are necessarily improved with the above first and second controls. However, on the level of the overall air-conditioning system (100) including the connection devices (41,42) and the harmonic generation load device (3), the power source quality including the power source power factors of the system (100) can be deemed to be improved. In this manner, the power source power factors can be controlled to fall within the reference range predetermined by electric power companies etc. Accordingly, administrators of the building etc. can avoid unwanted penalties such as a raise in electrical rate etc. due to the power source power factors exceeding the reference range.

In particular, the first and second controls are continuously performed while being alternately switched as necessary. Hence, the power source power factors fall within the reference range (for example, "0.9950-1.0049"), and can eventually even converge the target value (for example, "1") within the above reference range. Hence, the administrators of the building etc. can also obtain a further benefit regarding electrical rates such as preferential services of electrical rates based on the power source power factors etc.

Hereinafter, the contents of the above first and second controls will be described in detail with reference to a plurality of embodiments and their configurations.

First to Third Embodiments

In a first to a third embodiments, a harmonic generation load device (3) other than power converters (1,2) included in air conditioners (11,12) as well as generation sources of a harmonic current are connected in one electric power system. A plurality of active filter devices (5,6) are used to reduce the harmonic current. However, the active filter devices (5,6) each have only limited capability of reducing the harmonic current. When one of the active filter devices (5,6) is subject to load exceeding its capability of reducing the harmonic current, the active filter device (5,6) may malfunction, resulting in insufficient countermeasure against a harmonic.

That is, even though the plurality of devices generating the harmonic current are connected to the active filter devices (5,6), it is still desirable that the active filter devices (5,6) perform at least one of the reduction in harmonic current and the improvement in fundamental power factors without any excessive load thereto.

In view of the above, in the first to third embodiments, the following control is performed: in the above first and second controls, the compensation amount of each of the current sources (30) of the corresponding one of the active filter devices (5,6) meets the condition, i.e., is less than the maximum output capacity of the current source (30), and the compensation of the sum of the harmonic currents generated in the generation sources of harmonic current (1 to 3) should be distributed among and compensated by the current sources (30).

First Embodiment

<Configuration of Air-Conditioning System>

FIG. 1 shows a block diagram illustrating a configuration of the air-conditioning system (100) corresponding to the power source quality management system. In other words, the air-conditioning system (100) of FIG. 1 includes the plurality of air conditioners (11, 12) (in this example, two) and a dividing board (60). The air-conditioning system (100) performs air conditioning (cooling or warming) of internal air in the building etc. in which the system is installed.

The dividing board (60) is connected to the AC power source (4) and receives AC electric power from the AC power source (4). The dividing board (60) includes a plurality of breakers and distributes AC electric power among a plurality of devices through the breakers. In this example, the air conditioner (11, 12) is connected to part of the breakers. Each of the air conditioners (11, 12) operates on AC electric power supplied via the dividing board (60).

A harmonic generation load device (3) is connected to part of the breakers of the dividing board (60). In this example, the harmonic generation load device (3) includes a circuit such as an inverter circuit that may serve as a generation source of the harmonic current. Examples of the harmonic generation load device (3) include an elevator, a fan, a pump, and an escalator installed in the building etc., an illumination operated on a three-phase power source, as well as an air conditioner other than the air conditioners (11, 12) for which no countermeasure against harmonic current such as an active filter is provided.

<Configuration of Air Conditioner>

Each of the air conditioners (11,12) includes a refrigerant circuit (not shown) with a compressor, a power converter (1,2), and an active filter device (5,6).

The refrigerant circuit is configured by connecting the compressor, an outdoor-side heat exchanger, an expansion mechanism, and an indoor-side heat exchanger through a refrigerant pipe. The refrigerant circuit is filled with a refrigerant. Through circulation of the refrigerant in the refrigerant circuit, the indoor space is cooled or warmed.

The power converters (1,2) are connected to the AC power source (4) via the dividing board (60), and correspond to harmonic generation load devices. Each of the power converters (1,2) includes, though not shown, a converter circuit and an inverter circuit. Upon receipt of the AC electric power from the AC power source (4), each of the power converters (1,2) converts the AC electric power received to AC electric power having a desired frequency and a desired voltage, and supplies the power thus converted to the compressor (more specifically, to an electric motor included in the compressor). In this way, the compressor is activated and the refrigerant circuit functions, resulting in air conditioning of the indoor space.

As described above, not only in the harmonic generation load device (3) but also in each of the air conditioners (11,12), the harmonic current may be generated when the power converters (1,2) or the electric motor of the compressor operate. The harmonic current may flow to the AC power source (4) via a current channel for supplying electric power from the dividing board (60) to each of the air conditioners (11,12).

The level of such harmonic current flowing to the AC power source (4) is generally restricted. Hence, in the air-conditioning device (100) of the first embodiment, the harmonic current flowing out is reduced through each of the active filter devices (5,6). In view of the reduction in size of facility capacity, energy saving etc., improvement in the fundamental power factors is also desirable. The active filter devices (5,6) of the first embodiment also include the function of improvement in the fundamental power factors.

Hereinafter, the configuration of the active filter devices (5,6) will be described.

<Configuration of Active Filter Device>

Each of the active filter devices (5,6) is built in a corresponding one of the air conditioners (11,12). In FIG. 1, the number of the air conditioners (11,12) arranged is two, so that the number of the active filter devices (5,6) is also two. Note that the two active filter devices (5,6) have similar configurations.

Each of the active filter devices (5,6) is parallelly connected to, with respect to the AC power source (4), the power converters (1,2) that are harmonic generation load devices, and has a function of eliminating the harmonic current flowing out from the power converters (1,2) and appearing in a receiving channel (13) from the AC power source (4). That is, each of the active filter devices (5,6) makes compensation current flow so that current in the receiving channel (13) of the AC power source (4) has a substantially sinusoidal waveform. More specifically, each of the active filter devices (5,6) generates a compensation current with a phase opposite to that of the harmonic current appearing in the receiving channel (13), and supplies the compensation current to the receiving channel (13).

Each of the active filter devices (5,6) also has a function of improving the fundamental power factors through supply of the above compensation current. In this example, each of the active filter devices (5,6) is configured such that compensation current is also supplied to compensate idle components of fundamental wave, thereby improving the fundamental power factors.

To achieve the above function, each of the active filter devices (5,6) of the first embodiment includes, as shown in FIG. 1, a current source (30), filter-side current detectors (45a, 45b), a voltage detector (46), and a controller (43).

It is assumed that harmonic current becomes maximum that is generated in the power converters (1,2) included in each of the air conditioners (11,12) when load of the corresponding one of the air conditioners (11,12) becomes maximum (for example, at the time of maximum output during cooling). Hence, the capability (size of current or electrical power that can be generated without problems), i.e., the capacity of each of the active filter devices (5,6) is set in consideration of a harmonic current at the time of the maximum load of the corresponding one of the air conditioners (11,12). This capacity is called a maximum output capacity. However, generally speaking, the air conditioners (11,12) are mostly used under a load smaller than the maximum load (for example, intermediate load). Accordingly, in the above-described active filter devices (5,6) to which the maximum output capacity is set, it is deemed that the capability of the active filter devices becomes excessive during most of operation hours. —Power Source—

The current source (30) generates a compensation current for reducing harmonic current and improving fundamental power factor. The current source (30) includes its output terminals respectively connected to the power converters (1,2). The compensation current generated is output to the receiving channel (13).

Although not shown, the current source (30) of the first embodiment is configured by a so-called inverter circuit (active filter inverter unit). The controller (43) receives a switching command value (G) described later from the current source (30). In accordance with the switching command value (G), the current source (30) is switched and generates the compensation current. —Filter-Side Current Detector—

The filter-side current detectors (45a,45b) each detect current values (Ir2a, It2a, Ir3a, It3a) input to one of the current sources (30) of the corresponding one of the active filter devices (5,6).

In this example, two filter-side current detectors (45a, 45b) are arranged in one of the active filter devices (5,6). The filter-side current detector (45a) detects the current values (Ir2a, Ir3a) with a R-phase input to the corresponding current source (30) from the AC power source (4). The filter-side current detector (45b) detects the current values (It2a, It3a) with a T-phase input to the corresponding current source (30) from the AC power source (4). The current values (Ir2a,It2a,Ir3a,It3a) detected by the filter-side current detectors (45a,45b) are transmitted to the corresponding one of the controllers (43).

The configuration of the filter-side current detectors (45a, 45b) is not particularly limited, but examples thereof include a current transformer.

Further, the filter-side current detectors (45a, 45b) may be configured to transmit detection results to the controllers (43) by cable or in a wireless manner. —Voltage Detector—

The voltage detectors (46) are connected to the R-phase and the S-phase, but not to the T-phase, of the AC power source (4). The voltage detectors (46) each detect line voltage (Vrs) of the AC power source (4) only, and input it to the corresponding one of the controllers (43). —Controller—

The controllers (43) are each configured using a microcomputer and a memory device which stores a program for operating the microcomputer. As shown in FIG. 1, each of the controllers (43) is connected to a corresponding one of the current sources (30), the filter-side current detectors (45a,45b), and the voltage detectors (46), and to a load distributer (7) in the dividing board (60) described later. Each of the controllers (43) adjusts and controls the compensation current that is an output current of the corresponding one of the current sources (30) based on the detection results of the detectors (45a, 45b, 46) and signals from the load distributer (7).

<Configuration of Dividing Board>

As shown in FIG. 1, the number of the dividing board (60) provided in the air-conditioning system (100) is one. The dividing board (60) is disposed at a location between the AC power source (4), and each of the air conditioners (11,12) and the harmonic generation load device (3), and includes dividing-board-side current detectors (4a, 4b) and the load distributer (7).

The dividing-board-side current detectors (4a,4b) detect currents (Irs,Its) output from the AC power source (4).

In this example, the number of the dividing-board-side current detectors (4a, 4b) arranged in one dividing board (60) is two. The dividing-board-side current detector (4a) detects the current value (Irs) with the R-phase output from the AC power source (4). The dividing-board-side current detector (4b) detects the current value (Its) with the T-phase output from the AC power source (4). The current values (Irs,Its) detected by the dividing-board-side current detectors (4a,4b) are input to the load distributer (7).

The configuration of the dividing-board-side current detectors (4a,4b) is not particularly limited, but examples thereof include a current transformer.

Further, the dividing-board-side current detectors (4a, 4b) may be configured to transmit detection results to the load distributer (7) by cable or in a wireless manner.

The load distributer (7) is configured by a microcomputer and a memory device which stores a program for operating the microcomputer. As shown in FIG. 1, the load distributer (7) is connected to the dividing-board-side current detectors (4a,4b) and to one of the controllers (43) of the corresponding one of the active filter devices (5,6). The load distributer (7) adjusts and controls, with the controllers (43), the compensation current that is an output current of each of the current sources (30) based on the detection results of the dividing-board-side current detectors (4a,4b) and signals from each of the controllers (43).

<Adjustment and Control of Compensation Current Based on Maximum Output Capacity of Power Source>

As described above, the air-conditioning system (100) includes a plurality of harmonic generation load devices that are factors of generation of harmonic currents (specifically, the harmonic generation load device (3) and the two power converters (1,2)). Hence, the sum of the harmonic currents generated in the air-conditioning system (100) is higher than the case where only one harmonic generation load device is used. Even in this state, it is desirable to ensure the reduction in harmonic current of the active filter devices (5,6).

However, the amount of compensation current (i.e., the amount of compensation current of the current source (30)) which each of the active filter devices (5,6) can generate for the purpose of reduction in harmonic current without problem is limited based on the maximum output capacity of each of the active filter devices (5,6). When the amount of compensation current generated by one of the active filter devices (5,6) exceeds the maximum output capacity of the active filter device (5,6), the active filter device (5,6) is transitionally subject to load, which may cause malfunction of the active filter device (5,6).

In view of the above, the controller (43) and the load distributer (7) of the first embodiment function as calculation unit (90) that calculates the amount of the compensation current based on the maximum output capacity of each of the current sources (30) at the time of the above first and second controls.

Specifically, the calculation unit (90), in this case the load distributer (7), adjusts the load share among the current sources (30) in the first and second controls such that the sum of harmonic currents generated in the harmonic generation load device (3) and the power converters (1,2) is distributed among and compensated by the current sources (30). For this distribution, the calculation unit (90), in this case the load distributer (7), determines the share among the current sources (30) so that the amount of the compensation of one of the current sources (30) meets the condition, i.e., is less than the maximum output capacity of the current source (30). Then, the calculator (90), in this case each of the controllers (43), determines the amount of the compensation current to be generated by the corresponding one of the current sources (30), and also makes the corresponding current source (30) generate the amount thus determined in accordance with the share that is assigned to the corresponding current source (30) determined by the load distributer (7) in the first and the second controls.

Figure 3:
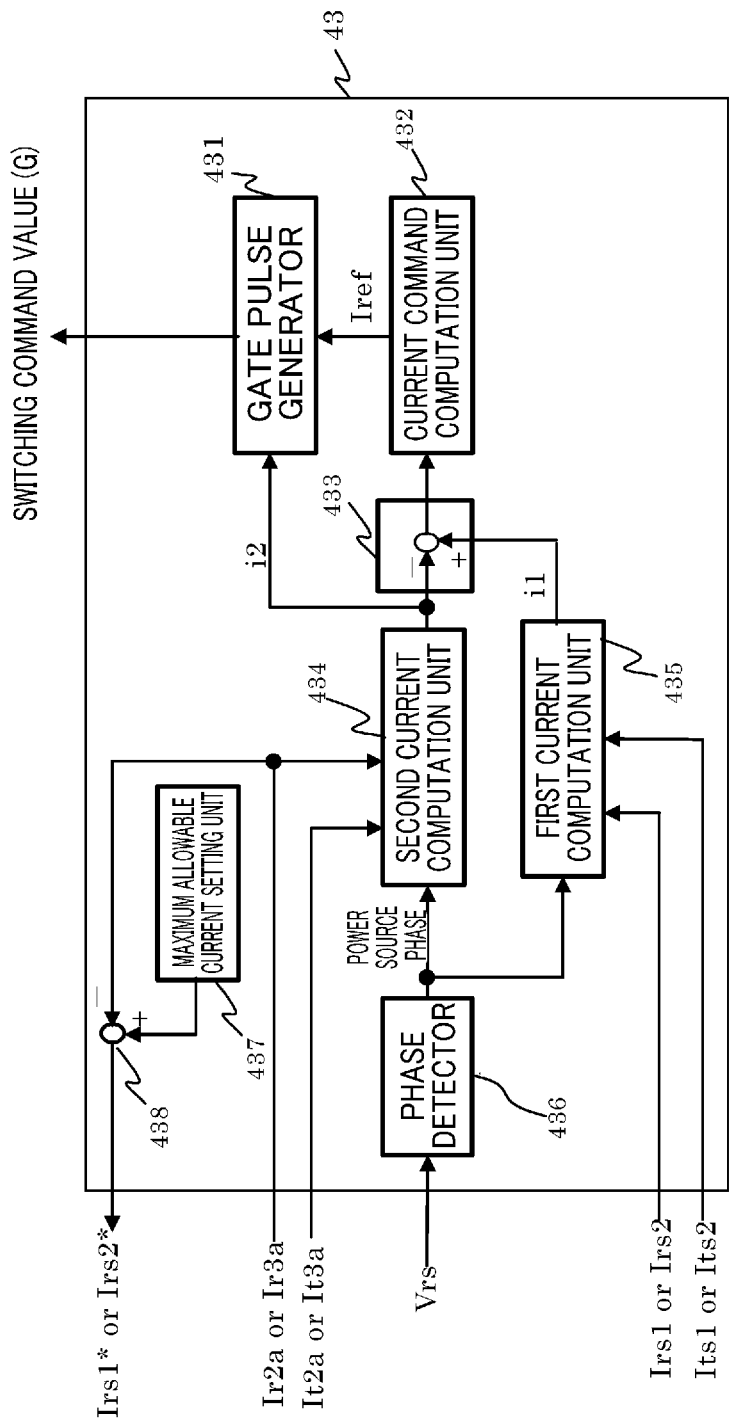
FIG. 3 shows a block diagram illustrating a configuration of a controller in an active filter device of the first embodiment.
Figure 4:
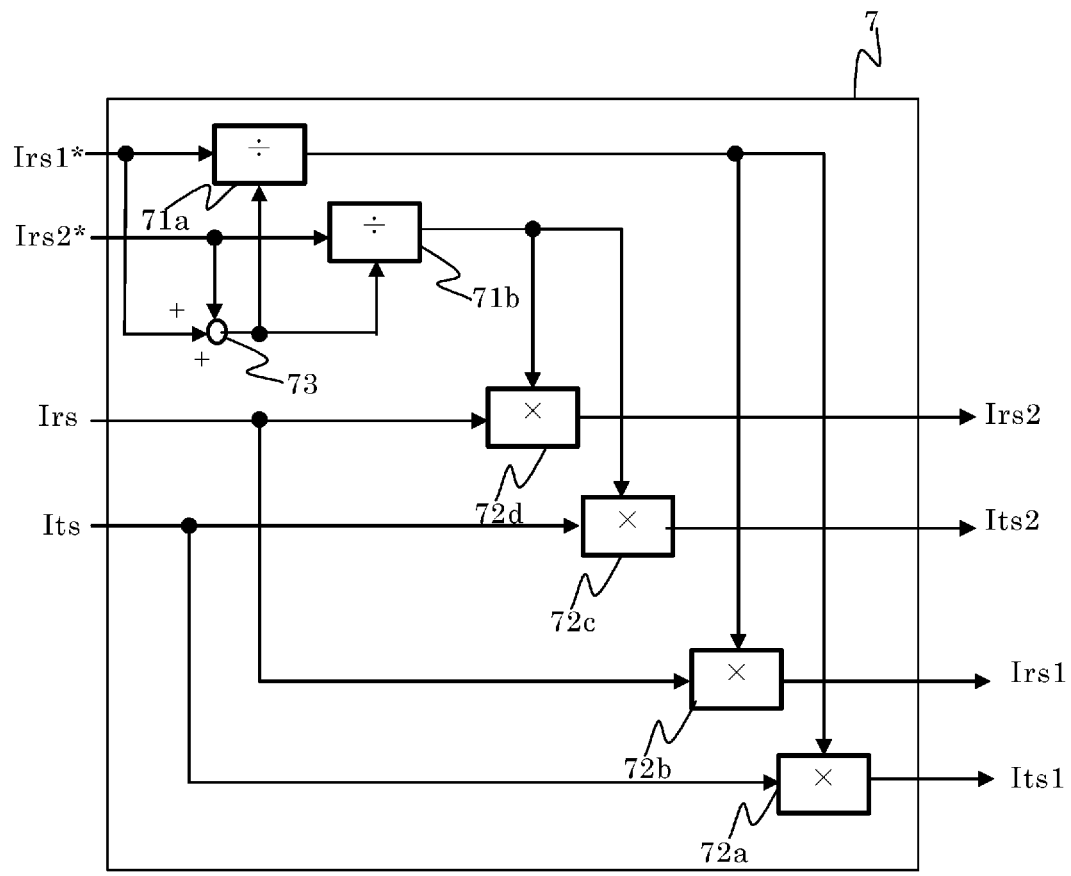
FIG. 4 shows a block diagram illustrating a configuration of a load distributer of the first embodiment.

Hence, as shown in FIG. 3, the controllers (43) each include a phase detector (436), a first current computation unit (435), a second current computation unit (434), a load current computation unit (433), a current command computation unit (432), and a gate pulse generation unit (431), a maximum allowable capacity current setting unit (437), and a subtraction unit (438). As shown in FIG. 4, the load distributer (7) includes a plurality of division units (71a,71b) (in this case, two), a plurality of multiplication units (72a, 72b, 72c, 72d) (in this case, four), and an addition unit (73).
—Phase Detector—

Each of the controllers (43) includes a phase detector (436) receiving a line voltage (Vrs) of the AC power source (4) detected by the corresponding one of the voltage detectors (46). The phase detector (436) uses the line voltage (Vrs) input, detects the phase of the power source voltage at the receiving channel (13), and outputs the phase detected to a first current computation unit (435) and a second current computation unit (434). —First Current Computation Unit—

The controller (43) of the active filter device (5) includes the first current computation unit (435) receiving the phase of the power source voltage detected by the phase detector (436) and the computation results (Its1, Irs1) obtained by the load distributer (7) using the dividing-board-side current detectors (4a,4b). The controller (43) of the active filter device (6) includes the first current computation unit (435) receiving the phase of the power source voltage detected by the phase detector (436) and the computation results (Its2, Irs2) obtained by the load distributer (7) using the dividing-board-side current detectors (4a,4b).

Each of the first current computation units (435) computes, based on the signals respectively input thereto, the values (hereinafter called "first current command value (i1)") indicating current values that are necessary for the corresponding one of the active filter devices (5,6) to perform compensation of a harmonic current at the receiving channel (13) (reduction in harmonic current) as well as compensation of idle components of a fundamental harmonic (improvement in fundamental power factor). Each of the first current computation units (435) outputs the first current command value (i1) thus computed to the corresponding one of the load current computation units (433).
—Second Current Computation Unit—

The controller (43) of the active filter device (5) includes the second current computation unit (434) receiving the phase of the power source voltage detected by the phase detector (436) and the detection results (Ir2a, It2a) obtained by the filter-side current detectors (45a,45b) of the active filter device (5) (i.e., current input to the active filter device (5)). The controller (43) of the active filter device (6) includes the second current computation unit (434) receiving the phase of the power source voltage detected by the phase detector (436) and the detection results (Ir3a, It3a) obtained by the filter-side current detectors (45a,45b) of the active filter device (6) (i.e., current input to the active filter device (6)) are input.

Each of the second current computation units (434) computes, based on the corresponding signals input thereto, the values (hereinafter called "second current command value (i2)") indicating currents flowing to the corresponding one of the active filter devices (5,6) in command to perform compensation of a harmonic current of the corresponding one of the active filter devices (5,6) at the present time (reduction in harmonic current) as well as compensation of idle components of a fundamental harmonic (improvement in fundamental power factor). Each of the second current computation units (434) outputs the second current command value (i2) thus computed to the corresponding one of the load current computation units (433). —Load Current Computation Unit—

The load current computation unit (433) of each of the controllers (43) subtracts the second current command value (i2) of the corresponding one of the second current computation units (434) from the first current command value (i1) of the corresponding one of the first current computation units (435), and outputs the subtraction results to the corresponding one of the current command computation units (432).

In this connection, the output currents (Irs, Iss, Its) of the respective phases of the AC power source (4), the input currents (Ir1, Is1, It1) of the respective phases of the harmonic generation load device (3), the input currents (Ir2, Is2, It2) of the respective phases of the air conditioner (11), the input currents (Ir2L, Is2L, It2L) of the respective phases input to the power converter (1) in the air conditioner (11), the input currents (Ir2a, Is2a, It2a) of the respective phases input to the active filter device (5) in the air conditioner (11), the input currents (Ir3, Is3, It3) of the respective phases of the air conditioner (12), the input currents (Ir3L, Is3L, It3L) of the respective phases input to the power converter (2) in the air conditioner (12), and the input currents (Ir3a, Is3a, It3a) of the respective phases input to the active filter device (6) in the air conditioner (12) are in the following current relationship.

[Math. 1]

$$R\text{-Phase: } Irs=Ir1+Ir2+Ir3=Ir1+Ir2L+Ir2a+Ir3L+Ir3a$$

$$S\text{-Phase: } Iss=Is1+Is2+Is3=Is1+Is2L+Is2a+Is3L+Is3a$$

$$T\text{-Phase: } Its=It1+It2+It3=It1+It2L+It2a+It3L+It3a \quad (1)$$

The results of the subtraction of the input currents (Ir2a, Is2a, It2a, Ir3a, Is3a, It3a) of each of the phases input to the corresponding one of the active filter devices (5,6) from the output currents (Irs, Iss, Its) of the respective phases of the AC power source (4) can be summarized as follows using the above formula (1):

[Math. 2]

$$R\text{-Phase: } Irs-Ir2a-Ir3a=Ir1+Ir2L+Ir2a+Ir3L+Ir3a-Ir2a-Ir3a=Ir1+Ir2L+Ir3L$$

$$S\text{-Phase: } Iss-Is2a-Is3a=Is1+Is2L+Is2a+Is3L+Is3a-Is2a-Is3a=Is1+Is2L+Is3L$$

T-Phase: $Its-It2a-It3a=It1+It2L+It2a+It3L+It3a-$
$It2a-It3a=It1+It2L+It3L$ (2)

The above formula (2) makes it possible to obtain the sum of the currents flowing to the harmonic generation load device (3) and the power converters (1,2) through subtraction of the input currents (Ir2a, Is2a, It2a, Ir3a, Is3a, It3a) of each of the phases input to the corresponding one of the active filter devices (5,6) from the output currents (Irs,Iss, Its) of the respective phases of the AC power source (4) Through utilization of the above, according to the first embodiment, the improvement in the fundamental power factors of the harmonic generation load device (3) and the power converters (1,2) and the suppression of harmonic currents generated are achieved, thereby making it possible to improve the fundamental power factors at distributing and receiving ends around the AC power source (4) and to reduce harmonic currents.

Through utilization of the above, the load current computation units (433) obtain the sum of currents flowing to the harmonic generation load device (3) and the power converters (1,2) through subtraction of the second current command value (i2) from the first current command value (i1). Further, as can be understood from the above, the dividing-board-side current detectors (4a,4b) and the filter-side current detectors (45a,45b) make it possible to improve the fundamental power factors at the distributing and receiving ends and to reduce harmonic currents, eliminating the need for detection of the input currents (Ir2L, Is2L, It2L, Ir3L, Is3L, It3L) input to the power converters (1,2). —Current Command Computation Unit—

The current command computation unit (432) of each of the controllers (43) computes the current value with a phase opposite to the computation results of the corresponding one of the load current computation units (433), and outputs the value thus computed as a current command value (Iref) to the corresponding one of the gate pulse generators (431). —Gate Pulse Generation Unit—

The gate pulse generation unit (431) of each of the controllers (43) generates a switching command value (G) commanding switching operation at an inverter circuit constituting the corresponding one of the current sources (30). Specifically, the gate pulse generator (431) performs a so-called feedback control in which operations of generating switching command values (G) are repeatedly performed based on deviations between the current values output from the current sources (30) and the above-mentioned current command value (Iref). Thus, each of the current sources (30) supplies a compensation current corresponding to the current command value (Iref) to the receiving channel (13). That is, each of the active filter devices (5,6) supplies the compensation current to the receiving channel (13). The compensation current is obtained through superimposition of the current corresponding to the first current command value (i1) and the current corresponding to the second current command value (i2). —Maximum Allowable Current Setting Unit—

The maximum allowable current setting unit (437) of each of the controllers (43) sets the maximum value (maximum output capacity) of the current value with which the current source (30) of the corresponding one of the active filter devices (5,6) generates and supplies without problems.

The above maximum value can be appropriately determined, for example, for each of the active filter devices (5,6) at the time of the production of the active filter devices (5,6). The above maximum value is determined in accordance with the capacity of a switching element constituting the current source (30), a rated current of parts such as the filter-side current detectors (451,45b) constituting each of the active filter devices (5,6) etc. —Subtraction Unit—

The subtraction unit (438) of each of the controllers (43) subtracts the detection results (Ir2a, Ir3a) of the filter-side current detector (45a) of the corresponding one of the active filter device (5,6) (i.e., currents flowing in the active filter device (5,6) at present time) from the maximum value of current values set for the maximum allowable current setting unit (437). This means that each of the subtraction units (438) calculates the current values (Irs1*, Irs2*) indicating surplus capacity of each of the active filter devices (5,6) at present time through subtraction of the present currents for compensation (corresponding to a first compensation amount) of the active filter device (5,6) from the maximum output capacity. That is, each of the subtraction units (438) calculates, as the above current values (Irs1*, Irs2*), a surplus amount that is a difference between the maximum output capacity and the first compensation amount through subtraction of the first compensation amount that is used for compensation of harmonic currents generated in part of the plurality of devices (1 to 3) generating harmonic currents from the maximum output capacity of the current source (30) of the corresponding one of the active filter devices (5,6) to which the subtraction unit (438) belongs.

The computation results (Irs1*,Irs2*) of the respective subtraction units (438) indicating the above surplus capacity are output to the load distributer (7). —Load Sharer—

As shown in FIG. 1, the output currents (Irs, Its) of the AC power source (4) according to the above formula (1) are detected by the dividing-board-side current detectors (4a, 4b) and input to the load distributer (7). As shown in FIG. 4, also the current values (Irs1*,Irs2*) indicating the surplus capacity, of each of the active filter devices (5,6), indicating the computation results of the subtraction unit (438) of each of the controllers (43) are input to the load distributer (7). The load distributer (7) calculates, based on the above input signals, the compensation currents (Irs1, Its1) that are compensation amounts distributed to the active filter device (5) and the compensation currents (Irs2,Its2) that are compensation amounts distributed to the active filter device (6). Specifically, this calculation determines the compensation amounts (compensation distribution) distributed to each of the active filter devices (5,6) such that the larger the surplus capacity of the corresponding one of the active filter devices (5,6) is, the larger the compensation amount to be distributed to the corresponding one of the active filter devices (5,6) becomes with respect to the currents (Irs, Its) flowing to the AC power source (4), as shown below.

First, the addition unit (73) adds the current value (Irs1*) indicating the surplus capacity of the active filter device (5) and the current value (Irs2*) indicating the surplus capacity of the active filter device (6). The addition results of the addition unit (73) are input to two division units (71a,71b).

The current value (Irs1*) indicating the surplus capacity of the active filter device (5) is input to the division unit (71a). The current value (Irs2*) indicating the surplus capacity of the active filter device (6) is input to the division unit (71b). The division unit (71a) divides the current value (Irs1*) by the addition result of the addition unit (73). The division unit (71b) divides the current value (Irs2*) by the addition result of the addition unit (73). That is, each of the division units (71a,71b) obtains the rate of the surplus capacity of the corresponding one of the active filter devices (5,6) at the present time with respect to the sum value of the surplus capacities of the active filter devices (5,6) arranged in the air-conditioning system (100) at the present time.

The division result of the division unit (71a) and the detection result (Its) of the dividing-board-side current detector (4b) are input to the multiplication unit (72a). The division result of the division unit (71a) and the detection result (Irs) of the dividing-board-side current detector (4a) are input to the multiplication unit (72b). The division result of the division unit (71b) and the detection result (Its) of the dividing-board-side current detector (4b) are input to the multiplication unit (72c). The division result of the division unit (71b) and the detection result (Irs) of the dividing-board-side current detector (4a) are input to the multiplication unit (72d).

Each of the multiplication units (72a to 72d) multiplies signals input, and outputs the results thus obtained to the controller (43) of the corresponding one of the active filter devices (5,6). Specifically, the multiplication results (Irs1, Its1) of the multiplication units (72b,72a) are output to the controller (43) of the active filter device (5). The multiplication results (Irs2, Its2) of the multiplication units (72d, 72c) are output to the controller (43) of the active filter device (6).

That is, each of the multiplication units (72a to 72d) multiplies the rate of the surplus capacity of each of the active filter device (5,6) at the present time with respect to the sum value of the surplus capacities of all the active filter devices (5,6) arranged in the air-conditioning system (100) at the present time by the output current (Irs,Its) of the AC power source (4), thereby calculating the compensation currents (Irs1, Its1, Irs2, Its2) that are the compensation amounts to be distributed to each of the active filter devices (5,6). Based on the above compensation currents (Irs1, Its1, Irs2, Its2), each of the controllers (43) performs current generation control of the corresponding one of the current sources (30).

<Details of Operation of Adjustment Control of Compensation Current>

Figure 5:
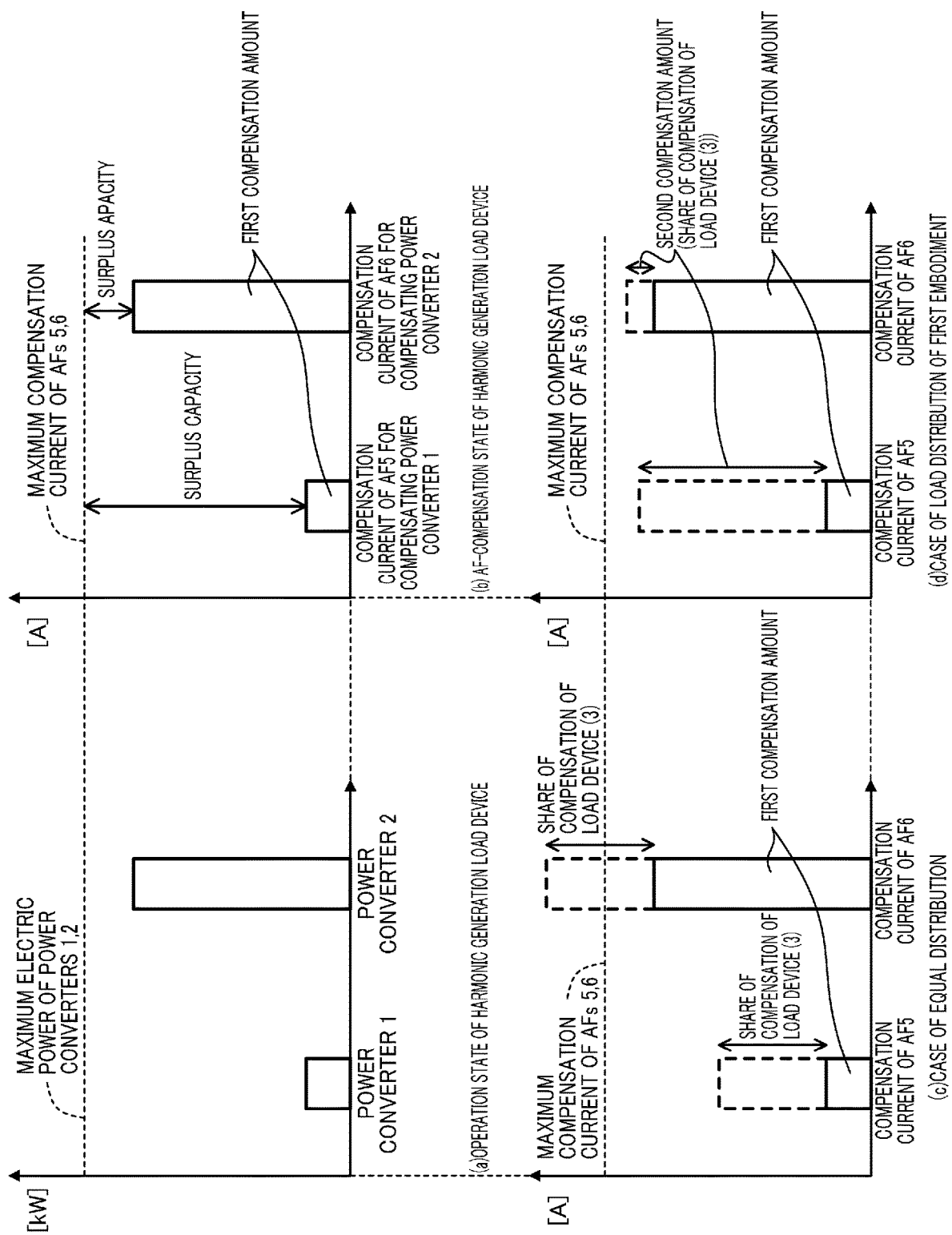
FIG. 5 illustrates graphs for explaining operation for adjustment controls of a compensation current of the first embodiment.

Referring to FIG. 5, the operations of adjustment control of compensation currents based on the maximum output capacity of the current source (30) of the first embodiment in the first and the second controls will be described. In an illustration (a) in FIG. 5, the vertical axis indicates electric power through which the operation state of each of the power converters (1,2) as harmonic generation load devices is illustrated. In the illustration (a) in FIG. 5, the power converter (1) scarcely operates; whereas, the power converter (2) has consumption electric power larger than that of the power converter (1). The power converter (2) operates in a state in which the above consumption electric power approaches the maximum electric power of the power converter (2). Note that the illustration (a) in FIG. 5 illustrates the case in which the maximum electric powers of both of the power converters (1,2) are almost the same.

An illustration (b) in FIG. 5 shows the compensation currents of each of the active filter devices (5,6) (designated by "AF" in FIG. 5) for compensating one of the power converters (1,2) in the corresponding one of the air conditioners (11,12). In the illustration in FIG. 5, the operation state of the power converters (1,2) is the same as in the case of the illustration (a) in FIG. 5, and the current amounts of the compensation currents generated by each of the active filter devices (5,6) are of a size correlated to the operation states (illustration (a) in FIG. 5) of each of the power converters (1,2). Specifically, the consumption electric power of the power converter (1) is smaller than that of the power converter (2). Hence, in the illustration (b) in FIG. 5, the compensation current amount (first compensation amount) of the active filter device (5) is smaller than the compensation current amount (first compensation amount) of the active filter device (6).

In the illustration (b) in FIG. 5, the maximum output capacity of each of the active filter devices (5,6) is indicated by the maximum compensation current that is maximum value of the currents that can be generated by each of the current sources (30) without problems. The maximum output capacities of the active filter devices (5,6) are identical to each other. The compensation current of each of the active filter devices (5,6) is smaller than the maximum compensation current. The difference between the maximum compensation current and the compensation current of each of the active filter devices (5,6) indicates surplus amount (surplus capacity) of the corresponding active filter device (5,6).

Illustrations (c) and (d) in FIG. 5 show, in addition to compensation of the power converters (1,2) (i.e., suppression of the harmonic current and improvement in fundamental power factors), the compensation amounts of the harmonic generation load device (3) for the active filter devices (5,6). The illustration (d) in FIG. 5 illustrates the case in which the compensation amount of the harmonic generation load device (3) (the sum value indicated by the dotted line of the illustration (c) in FIG. 5) is equally distributed among the active filter devices (5,6). In case of the equal distribution, as shown in the illustration (c) in FIG. 5, in the active filter device (5) with the compensation amount (first compensation amount) smaller than that of the power converter (1), the sum value of the compensation amounts of the power converter (1) and the harmonic generation load device (3) are smaller than the maximum compensation current allowable by the active filter device (5). On the other hand, in the active filter device (6) with the compensation amount (first compensation amount) larger than that of the power converter (2), the sum value of the compensation amounts of the power converter (2) and the harmonic generation load device (3) exceeds the maximum compensation current allowable by the active filter device (6).

Hence, in the first embodiment, as in the case with the part indicated by the dotted line of the illustration (d) in FIG. 5, the compensation amount of the harmonic generation load device (3) is distributed between the active filter device (5) and the active filter device (6) in accordance with the compensation state of each of the active filter devices (5,6), more specifically, the surplus amount of each of the active filter devices (5,6) that is a difference between the first compensation amount for compensating each of the power converters (1,2) of the corresponding one of the active filter devices (5,6) and the maximum compensation current of the corresponding one of the active filter devices (5,6). At this time, in the first embodiment, the compensation current of each of the active filter devices (5,6) is calculated in accordance with the surplus amount of the corresponding active filter device (5,6) such that the second compensation amount of the harmonic generation load device (3) to be distributed is larger for the active filter device (5,6) whose surplus amount is larger than that of the other active filter device (5,6).

In this way, as shown in the illustration (d) in FIG. 5, the compensation current amount of each of the active filter devices (5,6) obtained through superimposition of the first compensation amount and the second compensation amount can be less than the corresponding maximum compensation currents. Further, the difference between the compensation current amounts of the active filter devices (5,6) obtained through superimposition of the respective first compensation amounts and the respective second compensation amounts can be decreased between the active filter devices (5,6), so the compensation amounts are averaged as much as possible.

The operation of adjustment control of the compensation current of the illustration (d) in FIG. 5 is performed in the first and the second controls, as described above. As described in the section <<Overall System>>, the first and the second controls are performed while the power source power factor is checked at a predetermined interval (pt). Hence, the operation of adjustment control of the compensation current is also newly performed after the lapse of the predetermined interval (pt).

<Advantages>

In the first embodiment, the following effects can be obtained in addition to the effects described in connection with the section.

<<Overall System>>

In the first embodiment, the sum of the harmonic currents generated at the power converters (1,2) and the harmonic generation load device (3) is distributed among and compensated by a plurality of current sources (30). The compensation amount is determined not to exceed the maximum output capacity of the corresponding one of the current sources (30). In this way, in the case in which the harmonic generation devices exist in plural (specifically, the power converters (1,2) and the harmonic generation load device (3)), it is possible to reduce harmonic current and to improve fundamental current in a state in which each of the current sources (30) is effectively utilized without any excessive load to at least part of the plurality of the current sources (30).

In particular, in the first embodiment, the compensation current of each of the current sources (30) is determined in accordance with the surplus amount that is a difference between the first compensation amount already compensated by each of the current sources (30) and the maximum output capacity of the corresponding current source (30). In this way, the compensation current is determined to meet the condition, i.e., surely not to exceed the maximum output capacity.

In the first embodiment, the calculation units (90) calculate the compensation current of each of the current sources (30) such that the larger the surplus amount is, the larger the second compensation amount becomes that is the amount of harmonic current generated in the harmonic generation load device (3) to be distributed and compensated. In this way, the compensation amounts of the current sources (30) are averaged as much as possible. Hence, the risk of excessive load to any one of the current sources (30) can be reduced.

In the first embodiment, the maximum output capacity is the maximum compensation current value indicating the maximum value of currents that can be generated by the current sources (30). Through subtraction of the current value of the first compensation amount corresponding to the first compensation amount from the maximum compensation current value, the surplus amount is calculated.

In the first embodiment, at least one of the plurality of devices (1 to 3) that are generation sources of the harmonic current is a power converter supplied with electric power from the power source. Further, in the first embodiment, the active filter devices (5,6) are respectively integrated in the air conditioners (11,12).

Second Embodiment

Figure 6:
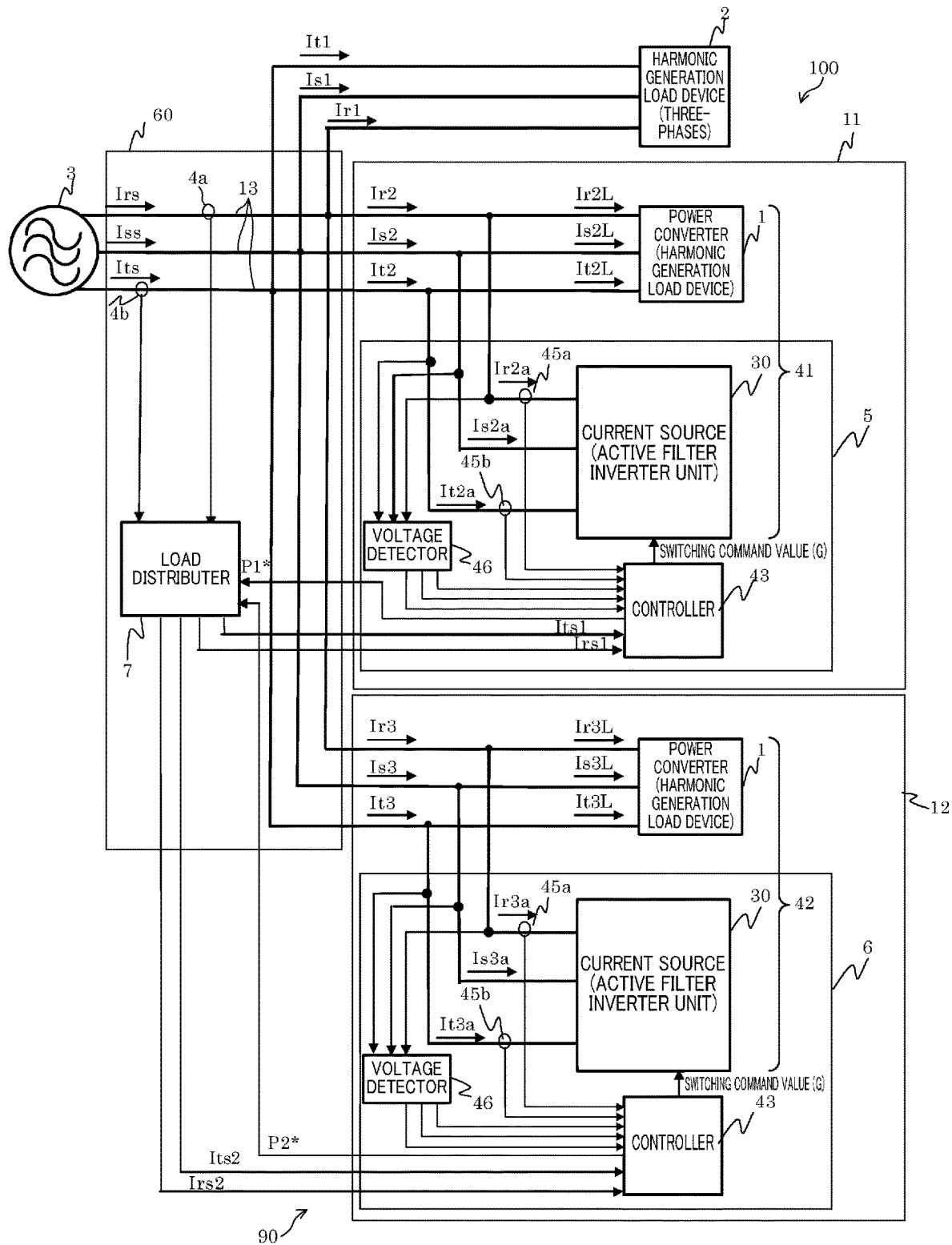
FIG. 6 shows a block diagram illustrating a configuration of an air conditioning system of a second embodiment.

FIG. 6 shows a block diagram schematically illustrating an air-conditioning system (100) according to a second embodiment. The second embodiment is different from the first embodiment in that the voltage detectors (46) are connected to the respective phases of the AC power source (4), and that the maximum output capacity is controlled as the maximum compensation electric power value instead of the maximum compensation current. In other points, the second embodiment is similar to the first embodiment. Hereinafter, only the points distinguishing the second embodiment from the first embodiment will be described.

As shown in FIG. 6, the voltage detectors (46) are connected to each of the R-phase, the S-phase and the T-phase. Each of the voltage detectors (46) detects the corresponding one of the line voltages (Vrs, Vst, Vtr) of the AC power source (4), and inputs it to the corresponding one of the controllers (43).

In each of the controllers (43) of the second embodiment, the electric power compensated by the corresponding one of the active filter devices (5,6) is calculated. Through subtraction of the calculation results thus obtained from the compensation electric power (maximum compensation electric power value) allowable by the corresponding one of the active filter devices (5,6) set in the maximum allowable electric power setting unit (440), surplus compensation electric power is calculated and output to the load distributer (7).

Figure 7:
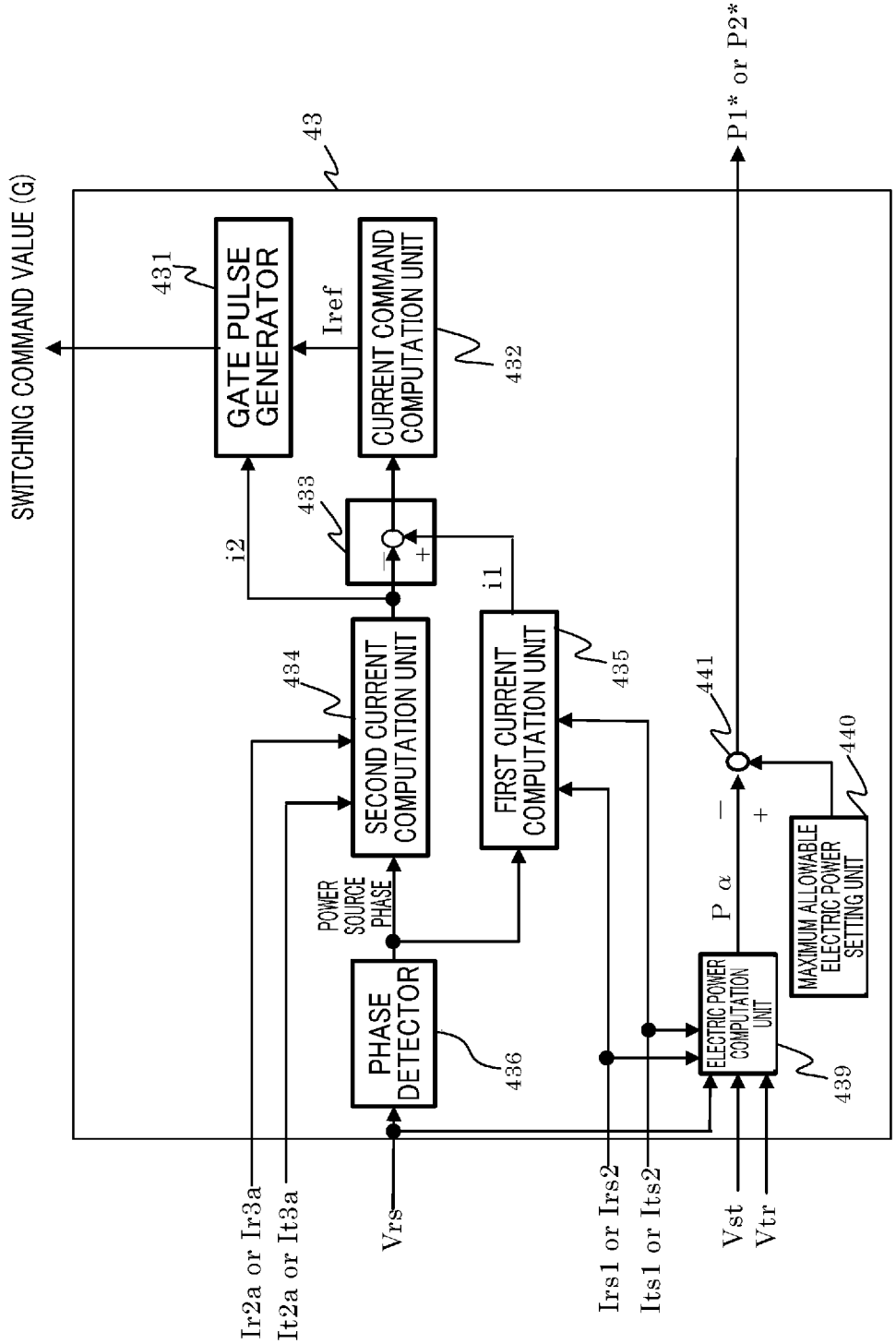
FIG. 7 shows a block diagram illustrating a configuration of a controller in an active filter device of the second embodiment.

Specifically, as shown in FIG. 7, the controllers (43) each include a phase detector (436), a first current computation unit (435), a second current computation unit (434), a load current computation unit (433), a current command computation unit (432), a gate pulse generation unit (431), an electric power computation unit (439), a maximum allowable capacity current setting unit (440), and a subtraction part (441). The phase detector (436), the first current computation unit (435), the second current computation unit (434), the load current computation unit (433), the current command computation unit (432), and the gate pulse generation unit (431) are similar to the parts designated by the same reference characters, i.e., are respectively similar to the phase detector (436), the first current computation unit (435), the second current computation unit (434), the load current computation unit (433), the current command computation unit (432), and the gate pulse generation unit (431) of the first embodiment.

The line voltages (Vrs, Vst, Vtr) detected by the voltage detector (46) of the active filter device (5) and the detection results (Ir2a, It2a) of the filter-side current detectors (45a, 45b) are input to the electric power computation unit (439) of the active filter device (5). The line voltages (Vrs, Vst, Vtr) detected by the voltage detector (46) of the active filter device (6) and the detection results (Ir3a, It3a) of the filter-side current detectors (45a,45b) are input to the electric power computation unit (439) of the active filter device (6). Each of the electric power computation units (439) computes rotational biaxial (43-axial) voltages Vα, Vβ and iα, 43 from the above signals input using the following formulas (3) and (4). The voltages used in the following formula (3) are phase voltages (Vr, Vs, Vt) and can be easily converted from the line voltages (Vrs, Vst, Vtr) detected using the electric circuit theory. Note that the following formula (4) exemplarily indicates the formula used by the electric power computation unit (439) of the active filter device (5). In the case in which the electric power computation unit (439) of the active filter device (6) is used, "Ir2a, It2a" are substituted with "Ir3a, It3a".

[Math. 3]

$$\begin{bmatrix} V\alpha \\ V\beta \end{bmatrix} = \frac{\sqrt{2}}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Vr \\ Vs \\ Vt \end{bmatrix} \quad (3)$$

[Math. 4]

$$\begin{bmatrix} i\alpha \\ i\beta \end{bmatrix} = \frac{\sqrt{2}}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Ir2a \\ -Ir2a - It2a \\ It2a \end{bmatrix} \quad (4)$$

Next, the electric power computation unit (439) computes, using the following formula (5), effective power Pα from the rotational biaxial (αβ-axial) voltages Vα, Vβ and currents iα, iβ obtained using the above formulas (3) and (4).

[Math. 5]

$$P\alpha = V\alpha \times i\alpha + V\beta \times i\beta \quad (5)$$

Each of the maximum allowable electric power setting units (440) sets the compensation electric power allowable by the corresponding one of the active filter devices (5,6), i.e., the maximum value of the electric power (maximum compensation electric power value) that can be output from the current source (30) of the corresponding one of the active filter devices (5,6).

Like in the first embodiment, the above maximum compensation electric power value can be appropriately determined, for example, for each of the active filter devices (5,6) at the time of the production of the active filter devices (5,6). The above maximum compensation electric power value is determined in accordance with a rated current of parts constituting each of the active filter devices (5,6) such as a rated capacity of a switching element constituting the current source (30).

Each of the subtraction units (441) subtracts electric power Pα computed by the above electric power computation unit (439) from the maximum allowable electric power value set in the maximum allowable electric power setting unit (440). The effective electric power Pα computed by each of the electric power computation units (439) means the electric power to be compensated (corresponding to the first compensation amount) by the corresponding one of the active filter devices (5,6) at the present time. Hence, through subtraction of the effective electric power Pα (i.e., the first compensation amount) computed by the electric power computation unit (439) from the maximum compensation electric power value, each of the subtraction units (441) of the corresponding one of the active filter devices (5,6) can calculate the electric power value (P1*,P2*) indicating the surplus capacity of the corresponding one of the active filter devices (5,6) at the present time to which the subtraction unit (441) belongs. That is, each of the subtraction units (441) calculates, as the above electric power value (P1*,P2*), the surplus amount (surplus capacity) that is a difference between the maximum output capacity and the first compensation amount through subtraction of the first compensation amount for compensating harmonic current generated at part of the devices (1 to 3) that are generation sources of harmonic current from the maximum output capacity of the current source (30) of the corresponding one of the active filter devices (5,6) to which each of the subtraction units (441) belongs.

Figure 8:
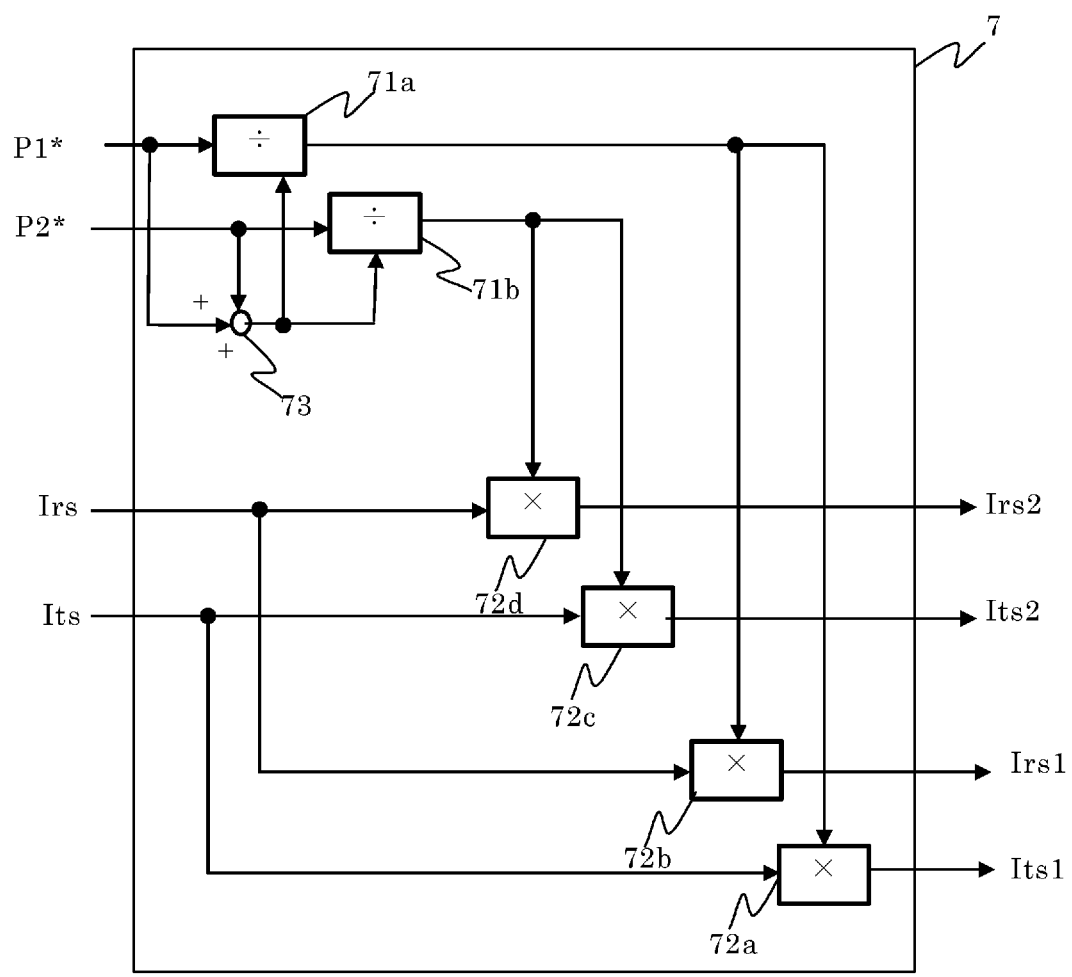
FIG. 8 shows a block diagram illustrating a configuration of a load distributer of the second embodiment.

In this way, the electric power values (P1*,P2*) each indicating the surplus capacity of the corresponding one of the active filter devices (5,6) calculated by the corresponding one of the subtraction units (441) are input to the one load distributer (7). As shown in FIG. 8, the configuration of the load distributer (7) of the second embodiment is similar to the load distributer (7) of the first embodiment shown in FIG. 4 except that a part of the signals (P1*,P2*) input is different from the case of the load distributer (7) of the first embodiment.

As shown in FIG. 8, in the load distributer (7) of the second embodiment, instead of the current value (Irs1*, Irs2*) indicating the surplus capacity of each of the active filter devices (5,6), the electric power value (P1*,P2*) indicating the surplus capacity of each of the active filter devices (5,6) at the present time is input to the addition unit (73) and the division units (71a,71b). Each of the division units (71a,71b) of the load distributer (7) obtains, based on the above electric power value (P1*,P2*), the rate of the surplus capacity of each of the active filter devices (5,6) at the present time with respect to the sum value of the surplus capacities of all the active filter devices (5,6) installed in the air-conditioning system (100) at the present time. Each of the multiplication units (72a to 72d) of the load distributer (7) multiplies, like in the first embodiment, the rate of the surplus capacity thus obtained by the detection results (Irs, Its) of the dividing-board-side current detectors (4a,4b) to calculate the compensation currents (Irs1, Its1, Irs2, Its2) to be distributed between the active filter devices (5,6).

The currents (Ir2a, Is2a, It2a, Ir3a, Is3a, It3a) flowing in each of the active filter devices (5,6) change in accordance with the state of the power source voltage of the AC power source (4). For example, the above currents (Ir2a, Is2a, It2a, Ir3a, Is3a, It3a) become small as the power source voltage increases. Hence, through calculation of the surplus capacity of the active filter devices (5,6) by using electric power, it is possible to perform adjustment control of compensation current while considering the phenomena in which the above currents (Ir2a, Is2a, It2a, Ir3a, Is3a, It3a) change in accordance with the power source voltage. Compared with the first embodiment in which the rate of the compensation share of load distributed between the active filter devices (5,6) changes in accordance with the surplus amount of the current value, the method of the second embodiment in which the rate of the compensation share of load distributed among the active filter devices (5,6) makes it easier to design the active filter devices (5,6).

Figure 9:
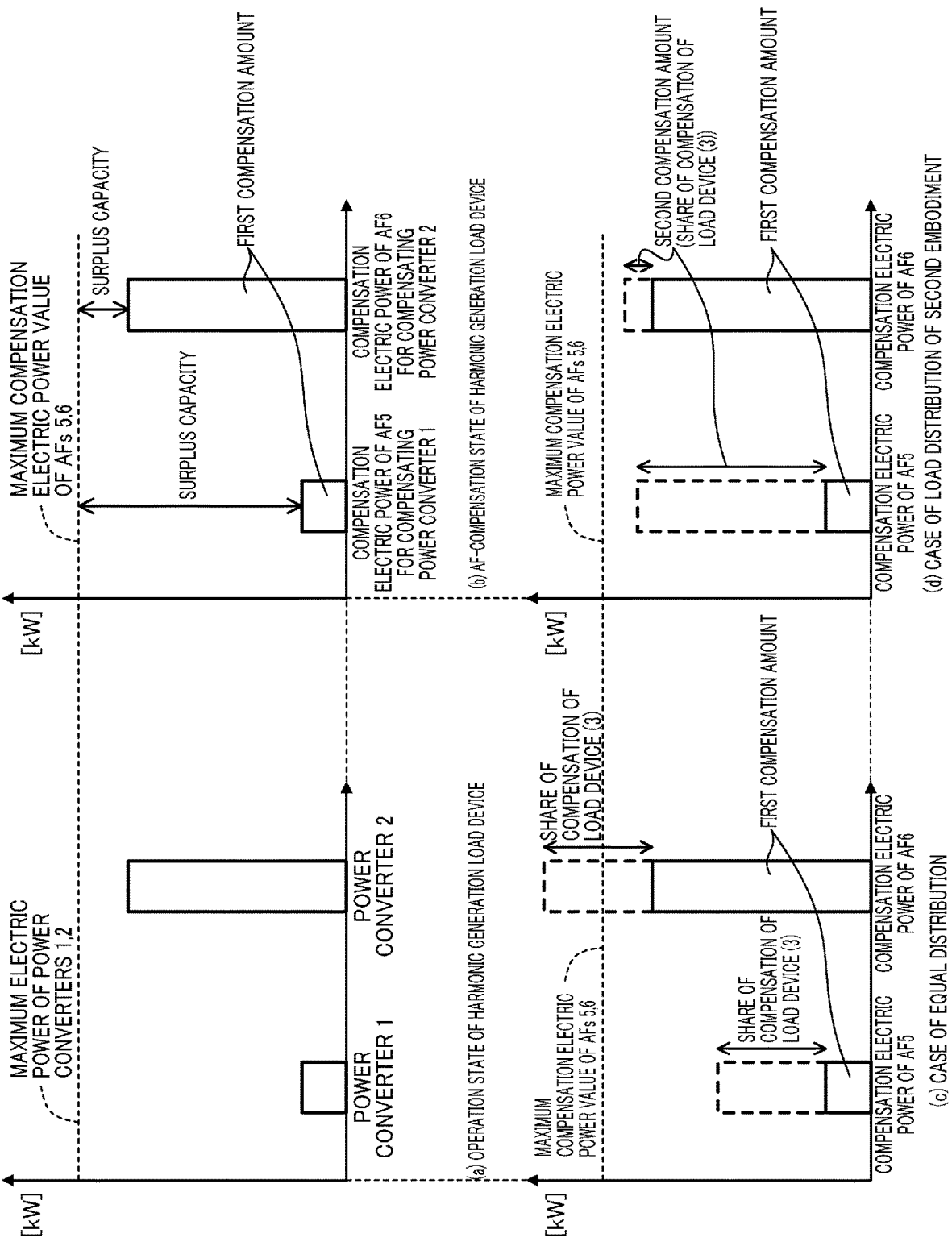
FIG. 9 illustrates graphs for explaining operation for adjustment controls of a compensation current of the second embodiment.

Referring to FIG. 9, the operations of adjustment control of compensation currents based on the maximum output capacity of the current source (30) of the second embodiment in the first and the second controls will be described. In an illustration (a) in FIG. 9, like in the illustration (a) in FIG. 5, the power converter (1) scarcely operates; whereas, the power converter (2) has consumption electric power larger than that of the power converter (1). The power converter (2) operates in a state in which the above consumption electric power approaches the maximum electric power of the power converter (2). Note that the illustration (a) in FIG. 9 illustrates the case in which the maximum electric powers of the power converters (1,2) are almost the same.

An illustration (b) in FIG. 9 shows the compensation electric powers of each of the active filter devices (5,6) (designated by "AF" in FIG. 9) of the corresponding one of the power converters (1,2) in the corresponding one of the air conditioners (11,12). In the illustration (b) in FIG. 9, the operation state of the power converters (1,2) is the same as in the case of the illustration (a) in FIG. 9, and the compensation electric power values (first compensation amount) of each of the active filter devices (5,6) are in a size correlated to the operation state of the corresponding one of the power converters (1,2). Specifically, in the illustration (b) in FIG. 9, the compensation electric power amount (first compensation amount) of the active filter device (5) is smaller than the compensation electric power amount (first compensation amount) of the active filter device (6).

In the illustration (b) in FIG. 9, the maximum output capacity of each of the active filter devices (5,6) is indicated by the maximum compensation electric power value that is maximum value of the electric powers that can be output by each of the current sources (30). The maximum compensation electric power values of the active filter devices (5,6) are identical to each other. The compensation electric power value (first compensation amount) of each of the active filter devices (5,6) is smaller than the maximum compensation electric power value. The difference between the maximum compensation electric power value and the compensation electric power value (first compensation amount) of each of the active filter devices (5,6) indicates surplus amount (surplus capacity) of the corresponding active filter device (5,6).

Illustrations (c) and (d) in FIG. 9 show, in addition to compensation of the power converters (1,2) (i.e., suppression of harmonic current and improvement of fundamental power factors), the compensation amounts of the harmonic generation load device (3) for the respective active filter devices (5,6). The illustration (c) in FIG. 9 illustrates the case in which the compensation amount of the harmonic generation load device (3) (sum value indicated by the dotted line of the illustration (c) in FIG. 9) is equally distributed between the active filter devices (5,6). In case of the equal distribution, as shown in the illustration (c) in FIG. 9, in the active filter device (5) with the compensation amount (first compensation amount) smaller than that of the power converter (1), the sum value of the compensation amounts of the power converter (1) and the harmonic generation load device (3) is smaller than the maximum compensation electric power value allowable by the active filter device (5). On the other hand, in the active filter device (6) with the compensation amount (first compensation amount) larger than that of the power converter (2), the sum value of the compensation amounts of the power converter (2) and the harmonic generation load device (3) exceeds the maximum compensation electric power value allowable by the active filter device (6).

Hence, in the second embodiment, as in the case with the part indicated by the dotted line of the illustration (d) in FIG. 9, the compensation amount of the harmonic generation load device (3) is distributed among the active filter device (5) and the active filter device (6) in accordance with the compensation state of each of the active filter devices (5,6), more specifically, the surplus amount of each of the active filter devices (5,6) that is a difference between the first compensation amount for compensating each of the power converters (1,2) of the corresponding one of the active filter devices (5,6) and the maximum compensation electric power value of the corresponding one of the active filter devices (5,6). At this time, the compensation current of each of the active filter devices (5,6) accompanied with the compensation electricity amount is calculated in accordance with the surplus amount of each of the active filter device (5,6) such that the second compensation amount of the harmonic generation load device (3) to be distributed is larger for the active filter device (5,6) whose surplus amount is larger than that of the other active filter device (5,6).

In this way, as shown in the illustration (d) in FIG. 9, the compensation electric power values correlated to the compensation current of each of the active filter devices (5,6) obtained through superimposition of the first compensation amount and the second compensation amount can be smaller than the corresponding maximum compensation electric power value. Further, the difference between the compensation electric power values correlated to the compensation currents of the active filter devices (5,6) becomes smaller, so that the compensation amounts are averaged as much as possible.

The operation of adjustment control of the compensation current of the illustration (d) in FIG. 9 is performed in the first and the second controls, as described above. As described in the section <<Overall System>>, the first and the second controls are performed while the power source power factor is checked at a predetermined interval (pt). Hence, the operation of adjustment control of the compensation current is also newly performed after the lapse of the predetermine interval (pt).

<Advantages>

In the second embodiment, substantially the same effects can be obtained as those effects described in connection with the section.

<<Overall System>>

In particular, in the second embodiment, the surplus amount is calculated by using the maximum compensation electric power value that can be output by the current source (30) as the maximum output capacity. The electric power is equal to the product of the current and the voltage. Hence, the surplus amount is obtained from the electric power, thereby making it possible to calculate the amount of the compensation current flexibly in accordance with various combination patterns of the currents and the voltages without paying particular attention to the individual values of the current and the voltage. This results in relatively easier designing of the active filter devices (5,6).

Third Embodiment

Figure 10:
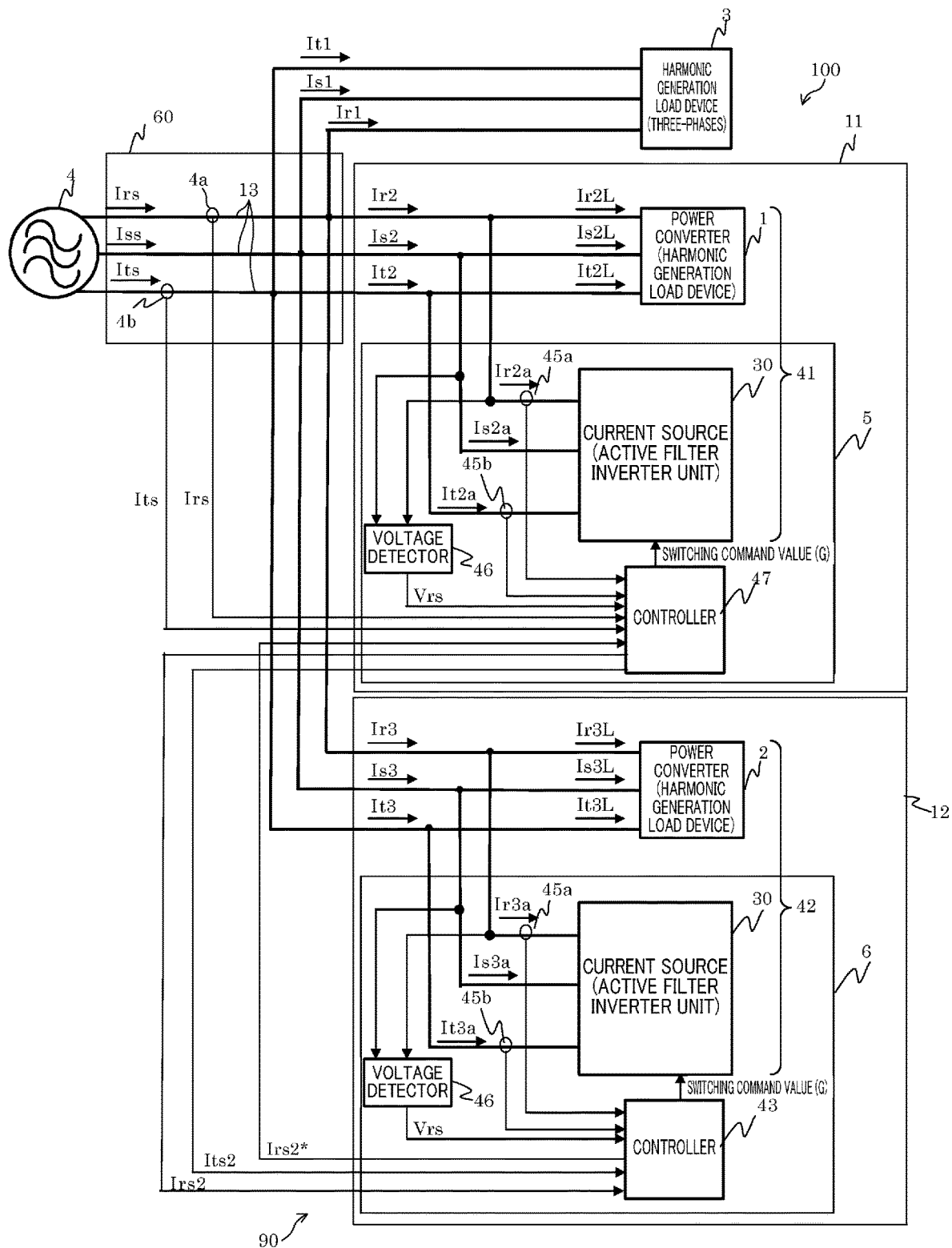
FIG. 10 shows a block diagram illustrating a configuration of an air conditioning system of a third embodiment.
Figure 11:
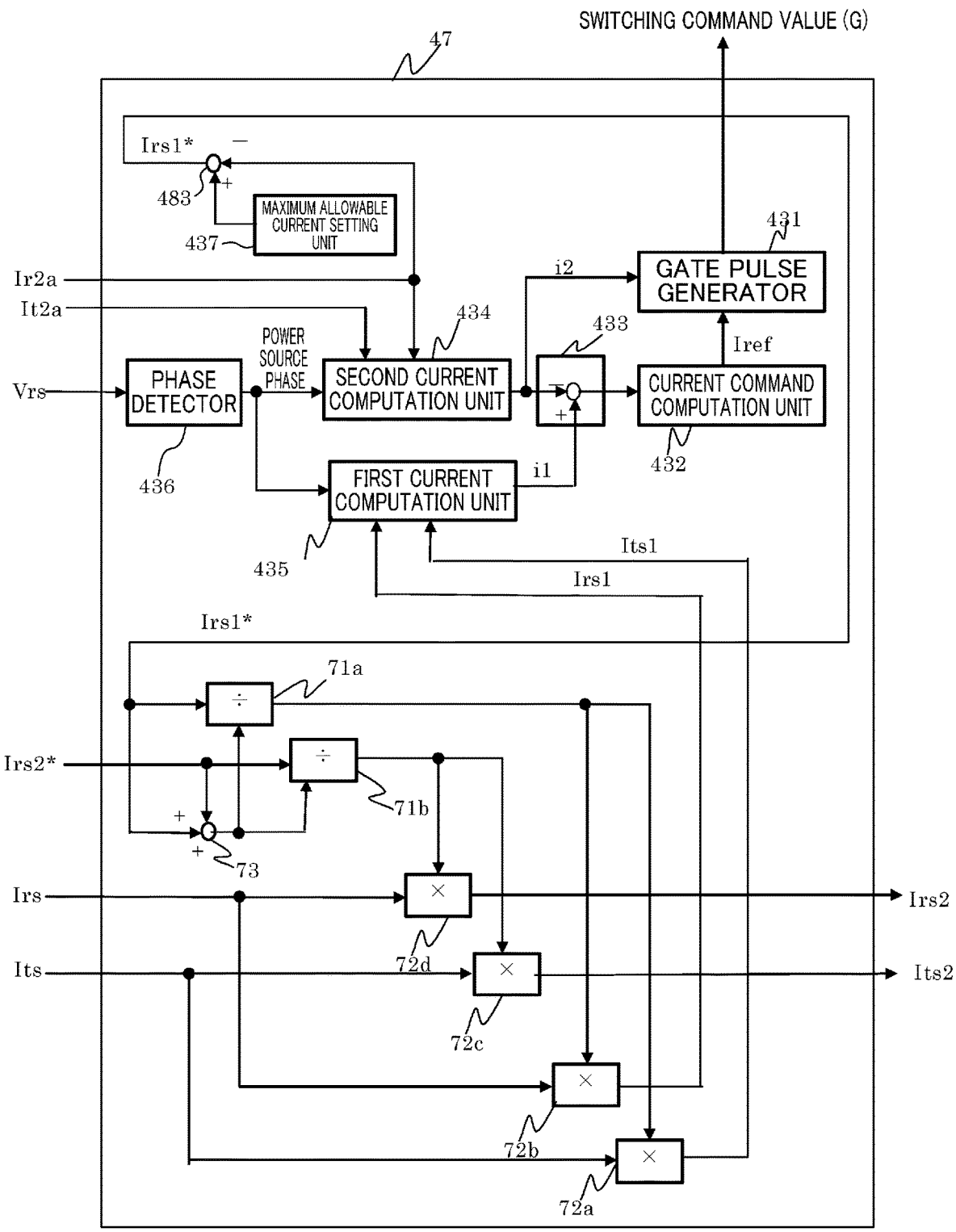
FIG. 11 shows a block diagram illustrating a configuration of a controller in an active filter device of the third embodiment.

FIG. 10 shows a block diagram schematically illustrating an air-conditioning system (100) according to the third embodiment. In the third embodiment, unlike in the first embodiment, there is no load distributer (7) in a dividing board (60). Instead, the function of a load distributer (7) is integrated in a controller (47) of an active filter device (5) of an air conditioner (11), as shown in FIG. 11. The other configuration and the control of this embodiment is the same as, or similar to, those of the first embodiment.

Specifically, as shown in FIG. 10, the dividing board (60) of the third embodiment includes only dividing-board-side current detectors (4a, 4b). As shown in FIG. 11, the active filter device (5) of the air conditioner (11) includes the controller (47) with a configuration obtained through combination of the load distributer (7) and the controller (43) of the first embodiment. The controller (47) is, like the above controller (43), configured by a microcomputer and a memory device storing a program for operating the microcomputer. Accordingly, in the third embodiment, there is no need for providing a microcomputer, a memory device etc. because no load distributer (7) in the sense of the first embodiment is provided, resulting in reduction in cost.

A controller (43) of an active filter device (6) of an air conditioner (12) is similar to the controller (43) of the first embodiment.

In this air-conditioning system (100), the controller (47) of the active filter device (5) serves as a master device; whereas, the controller (43) of the active filter device (6) serves as a slave device. In the third embodiment, the combination of the controller (43) and the controller (47) corresponds to a calculation unit (90).

The controller (47) obtains, in the first and the second controls, the amount of share to be distributed to each of the active filter devices (5,6) from the surplus amount (surplus capacity) that is a difference between a maximum output capacity and a first compensation amount for the corresponding active filter device (5,6), and calculates a compensation current (Irs1, Its1, Irs2, Its2) for the amount of share. In this connection, the controller (47) generates a switching command value (G) using the compensation current (Irs1, Its1), and outputs it to the corresponding one of the current sources (30) (i.e., the current source (30) of the active filter device (5)). On the other hand, the controller (47) outputs the compensation current (Irs2, Its2) to the controller (43) of the active filter device (6). The controller (43) generates the switching command value (G) using the compensation current (Irs2, Its2), and outputs it to the corresponding one of the current sources (30) (i.e., the current source (30) of the active filter device (6)).

The third embodiment provides the same advantages and effects as those of the above first embodiment.

Note that the configuration of the third embodiment may be applied to the second embodiment.

Fourth to Sixth Embodiments

In the fourth to sixth embodiments, like in the above first to third embodiments, generation sources of a harmonic current are connected to each other in one electric power system. In the first and the second controls, the active filter devices (5,6) share the task of reducing harmonic current. However, the method of sharing is different from those of the above first to third embodiments. In the above first to third embodiments, in the first and the second controls, the active filter devices (5,6) (specifically, their current sources (30)) perform the operations at the same time. On the contrary, in the fourth to sixth embodiments, in the first and the second controls, the start times of the operation of each of the active filter devices (5,6) are intentionally different.

Fourth Embodiment

<Configuration of Air-Conditioning System>

Figure 12:
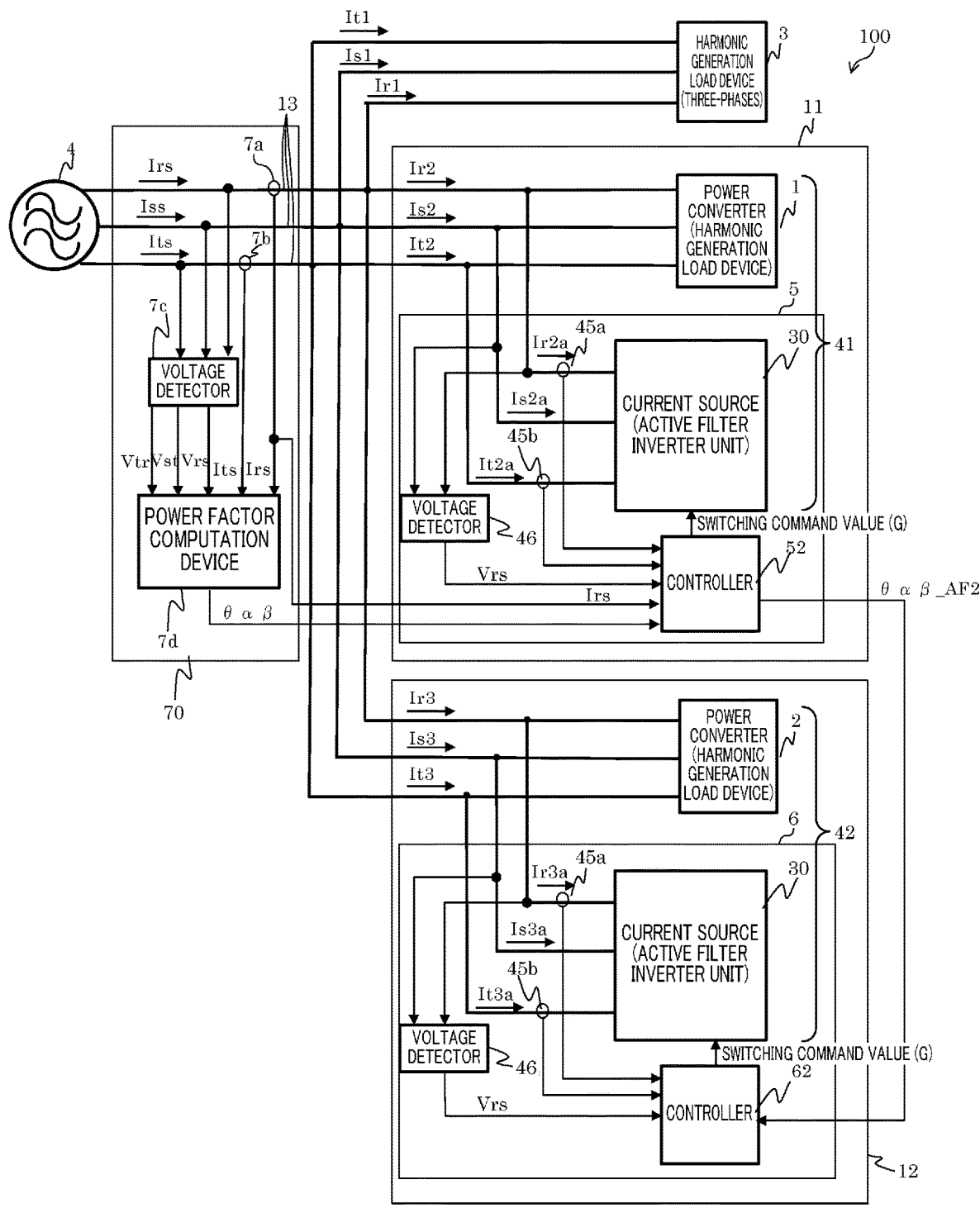
FIG. 12 shows a block diagram illustrating a configuration of an air conditioning system according to a fourth embodiment.

FIG. 12 shows a configuration of an air-conditioning system (100) corresponding to a power source quality management system of the fourth embodiment. The air-conditioning system (100) includes a harmonic generation load device (3), a plurality of (in this case, two) air conditioners (11,12) including connection devices (41,42), and a power factor detector (70). The air-conditioning system (100) performs air conditioning (cooling or warming) of internal air in the building etc. in which the system is installed.

Like in the first to third embodiments, examples of the harmonic generation load device (3) include an elevator installed in a building etc., another air conditioner besides the air conditioners (11,12), etc.

<Configuration of Air Conditioner>

Each of the air conditioners (11,12) includes a refrigerant circuit (not shown) with a compressor, power converters (1,2) that are other generation sources of a harmonic current (harmonic generation load devices) different from the above-mentioned harmonic generation load device (3), and the active filter devices (5,6).

The power converters (1,2) are connected to an AC power source (4). Each of the power converters (1,2) includes, though not shown, a converter circuit and an inverter circuit. Upon receipt of the AC electric power from the AC power source (4), each of the power converters (1,2) converts the AC electric power received to AC electric power having a desired frequency and a desired voltage and supplies the power thus converted to the compressor (more specifically, to an electric motor included in the compressor). In this way, the compressor is activated and the refrigerant circuit functions, resulting in air conditioning of the indoor space.

As described above, not only in the harmonic generation load device (3) but also in each of the air conditioners (11,12), the harmonic current may be generated when the power converters (1,2) or the electric motor of the compressor operates. The harmonic current may flow to the AC power source (4) via a current channel for supplying electric power from the AC power source (4) to each of the air conditioners (11,12). The level of such harmonic current flowing to the AC power source (4) is generally restricted. Hence, in the air-conditioning device (100), the harmonic current flowing out is reduced through each of the active filter devices (5,6).

In view of the reduction in size of facility capacity, energy saving etc., improvement in the fundamental power factors is also desirable. The active filter devices (5,6) of the fourth embodiment also include the function of improvement in the fundamental power factors.

Hereinafter, the configuration of the active filter devices (5,6) will be described.

<Configuration of Active Filter Device>

Each of the active filter devices (5,6) is built in the corresponding one of the air conditioners (11,12).

Each of the active filter devices (5,6) is parallelly connected to, with respect to the AC power source (4), the power converters (1,2) that are harmonic generation load devices, and has a function of eliminating harmonic current appearing in a receiving channel (13) from the AC power source (4) and flowing out from the power converters (1,2). That is, each of the active filter devices (5,6) makes compensation current flow so that current in the receiving channel (13) of the AC power source (4) has a substantially sinusoidal waveform. More specifically, each of the active filter devices (5,6) generates a compensation current with a phase opposite to that of the harmonic current appearing in the receiving channel (13), and supplies the compensation current to the receiving channel (13).

Each of the active filter devices (5,6) also has a function of improving the fundamental power factors through supply of the above compensation current. In this example, each of the active filter devices (5,6) is configured such that the compensation current is also supplied to compensate idle components of fundamental wave, thereby improving the fundamental power factors.

To achieve the above function, each of the active filter devices (5,6) as in the case of the first embodiment includes, as shown in FIG. 12, a current source (30), filter-side current detectors (45a, 45b), a voltage detector (46), and controllers (52,62).

Hence, the maximum output capacity of each of the active filter devices (5,6) is set in consideration of the harmonic current at the time of the maximum load to the corresponding one of the air conditioners (11,12), as in the case of the first embodiment. It should be noted, however, that the capability of the active filter devices (5,6) becomes excessive during the most period of operation hours, since the air conditioners (11,12) are mostly used with a load smaller than the maximum load (for example, intermediate load).
—Power Source—

The current source (30) generates a compensation current for reducing a harmonic current and improving a fundamental power factor. The electric current source (30) has its output terminals respectively connected to the power converters (1,2). The compensation current generated is output to the receiving channel (13).

Like in the first embodiment, the electric current source (30) is configured by a so-called inverter circuit (active filter inverter part). In accordance with the switching command value (G) input from the corresponding one of the controllers (52,62), each of the electric current sources (30) is switched and generates the compensation current. —Filter-Side Current Detector—

The filter-side current detectors (45a,45b) each detect current values (Ir2a, It2a, Ir3a, It3a) input to one of the current sources (30) of the corresponding one of the active filter devices (5,6). In this example, as in the case of the first embodiment, two filter-side current detectors (45a, 45b) are arranged in one of the active filter devices (5,6).

The filter-side current detector (45a) detects the current values (Ir2a, Ir3a) with the R-phase input to the corresponding current source (30) from the AC power source (4). The filter-side current detector (45b) detects the current values (It2a, It3a) with the T-phase input to the corresponding current source (30) from the AC power source (4). The current values (Ir2a, It2a, Ir3a, It3a) detected by the filter-side current detectors (45a,45b) are transmitted to the corresponding one of the controllers (52,62).

The filter-side current detectors (45a, 45b) may be configured through, for example, a current transformer. Further, the filter-side current detectors (45a,45b) may be configured to transmit detection results to each of the controllers (52,62) by cable or in a wireless manner. —Voltage Detector—

The voltage detector (60) is connected to the R-phase and the S-phase of the AC power source (4) and detects the line voltage (Vrs) of the AC power source (4). The detection results are input to the corresponding controllers (52,62).
—Controller—

The controllers (52,62) are each configured by a microcomputer and a memory device storing a program for operating the microcomputer. As shown in FIG. 12, each of the controllers (52,62) is connected to the corresponding one of the electric current sources (30), the filter-side current detectors (45a,45b) and the corresponding one of the voltage detectors (46).

Further, the controller (52) is also connected to a power factor computation device (7d) and a power source-side current detector (7a) in the power factor detector (70); whereas, the controller (62) is not connected to the power factor detector (70).

Further, the controller (52) and the controller (62) are connected to each other.

The controller (52) adjusts and controls the compensation current that is an output current of the corresponding one of the current sources (30) based on the detection results of the corresponding one of the detectors (45a, 45b, 46, 7a) and the calculation results (power source power factor θαβ) in the power factor detector (70), thereby changing the input power factor of the air conditioner (11).

The controller (62) adjusts and controls the compensation current that is an output current of the corresponding one of the current sources (30) based on signals from the controller (52) and the detection results of the corresponding one of the detectors (45a, 45b, 46), thereby changing the input power factor of the air conditioner (12).

The detailed configuration and operation of the controllers (52,62) will be described in the part "Power Source Quality Improvement Control Operation Achieved by Controllers".

<Configuration of Power Factor Detector>

The power factor detector (70) is disposed between the AC power source (4), and each of the air conditioners (11,12) and the harmonic generation load device (3), and detects the power source power factor of the AC power source (4) at, for example, a predetermined interval ("pt" of FIG. 1). The power factor detector (70) includes the power source-side current detectors (7a,7b), the voltage detector (7c) and the power factor computation device (7d).

The power source-side-current detectors (7a,7b) detect a current (Irs, Its) output from the AC power source (4). The power source-side current detector (7a) detects the current value (Irs) with the R-phase output from the AC power source (4). The power source-side current detector (7b) detects the current values (Its) with the T-phase output from the AC power source (4). The current values (Irs) detected by the power source-side current detector (7a) are input to the power factor computation device (7d) and the controller (52). The current values (Its) detected by the power source-side current detector (7a) are input to the power factor computation device (7d).

The power source-side current detectors (7a,7b) may be configured through, for example, a current transformer. Further, the power source-side current detectors (7a,7b) may be configured to transmit detection results by cable or in a wireless manner.

The voltage detector (7c) is connected to each of the phases of the AC power source (4) and receives line voltages (Vrs, Vst, Vtr) of the AC power source (4). The detection results of the voltage detector (7c) are input to the power factor computation device (7d).

The power factor computation device (7d) obtains, from the line voltages (Vrs, Vst, Vtr) and the current values (Irs, Its) input, rotational biaxial (43-axial) voltages Vα, Vβ and currents iα, iβ through computation using the following formulas (6) and (7). The voltages used in the following formula (6) are phase voltages (Vr, Vs, Vt) and can easily be converted from the line voltages (Vrs, Vst, Vtr) detected using the electric circuit theory.

[Math. 6]

$$\begin{bmatrix} V\alpha \\ V\beta \end{bmatrix} = \frac{\sqrt{2}}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Vr \\ Vs \\ Vt \end{bmatrix} \quad (6)$$

[Math. 7]

$$\begin{bmatrix} i\alpha \\ i\beta \end{bmatrix} = \frac{\sqrt{2}}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Irs \\ -Irs - Its \\ Its \end{bmatrix} \quad (7)$$

Next, the power factor computation unit (7d) computes, using the following formula (8), effective power Pα from the rotational biaxial (αβ-axial) voltages Vα, Vβ and currents iα,iβ obtained using the above formulas (6) and (7). The power factor computation unit (7d) also computes, using the following formula (9), reactive power PP from the rotational biaxial (αβ-axial) voltages Vα, Vβ and currents iα,iβ obtained using the above formulas (6) and (7).

[Math. 8]

$$P\alpha = V\alpha \times i\alpha + V\beta \times i\beta \quad (8)$$

[Math. 9]

$$P\beta = V\alpha \times i\beta - V\beta \times i\alpha \quad (9)$$

The power factor computation unit (7d) computes the power source power factor θαβ of the AC power source (4) using the following formula (10) from effective power Pα and the reactive power Pα obtained. That is, the power source power factor θαβ obtained by the power factor computation device (7d) means the real power source power factors θαβ at the present time.

[Math. 10]

$$\theta\alpha\beta = \frac{P\alpha}{\sqrt{(P\alpha)^2 + (P\beta)^2}} \quad (10)$$

The power source power factor θαβ as the computation result is input to the controller (52) of the air conditioner (11).

<Power Source Quality Improvement Control Operation Achieved by Controllers>

The controllers (52,62) in each of the air conditioners (11,12) of the fourth embodiment perform, in the first and the second controls, adjustment of the input power factors of the air conditioners (11,12) through adjustment of the output current from the current sources (30), thereby performing power source quality improvement control for controlling the power source power factors. The detailed power source quality improvement control is as follows: Based on the power source power factors, input power factors of the first air conditioner (11) that is one of the plurality of air conditioners (11,12) are changed to increase or decrease the power source power factors, thereby performing improvement. Then, the second air conditioner (12) that is the rest of the plurality of air conditioners (11,12) are subject to change in input power factors.

To achieve the above power source quality improvement control, in the fourth embodiment, the controller (52) performs adjustment of the input power factors for the air conditioner (11) in which the controller (52) is included. Then, the controller (62) performs adjustment of the input power factors for the air conditioner (12) in which the controller (62) is included.

Hereinafter, the detailed configuration of the controllers (52,62) for performing the above operations will be described.

Note that the controllers (52,62) are not identical to each other but different from each other in their detailed configuration. For convenience of explanation, the air conditioner (11) for which the input power factors change first is called the "first air conditioner". The air conditioner (12) for which the input power factors change later is called the "second air conditioner". —Controller (52) included in the First Air Conditioner (11)—

Figure 13:
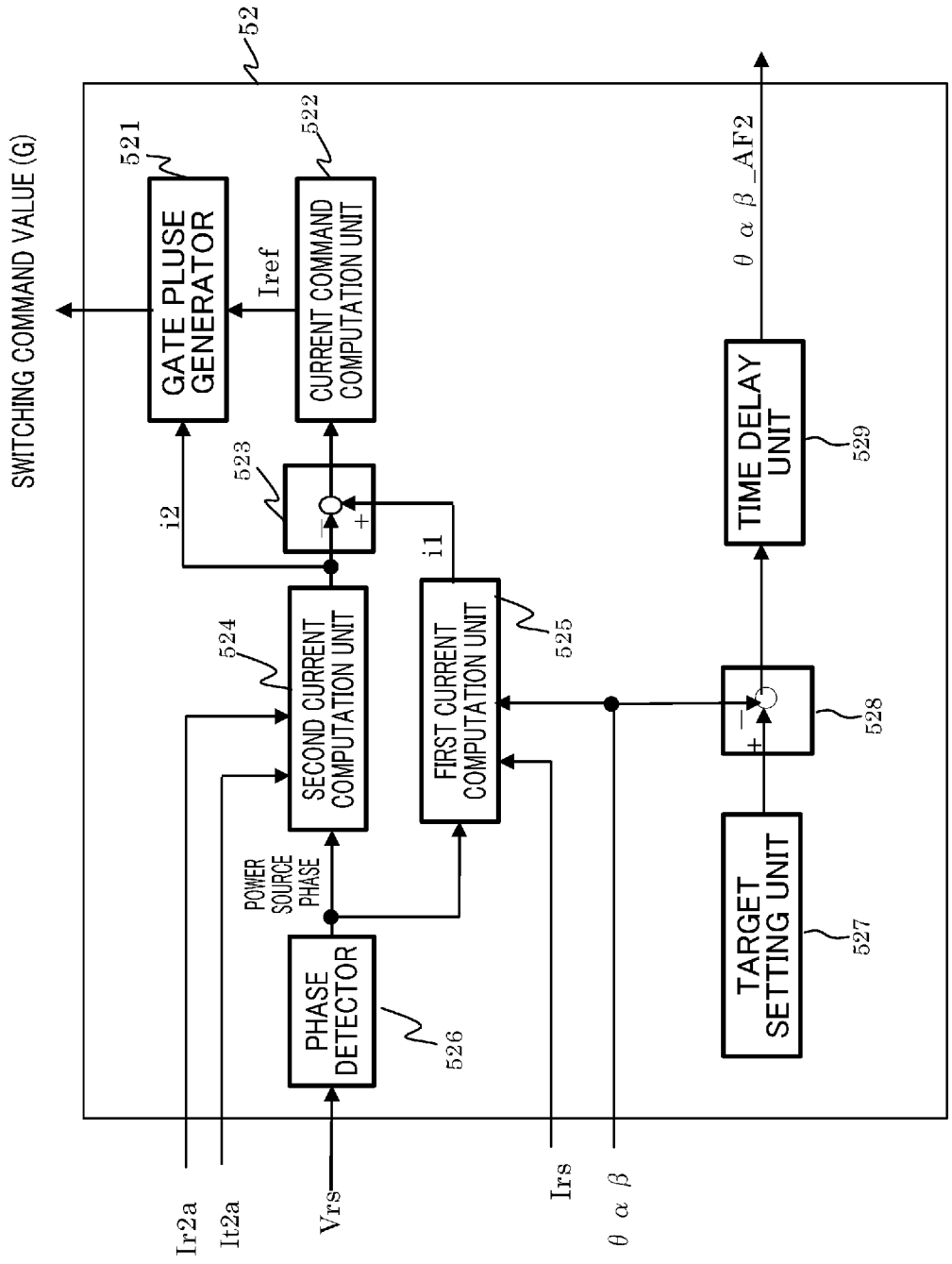
FIG. 13 shows a block diagram illustrating a configuration of a controller in a first active filter device of the fourth embodiment.

Since the program stored in the memory device is implemented by the microcomputer, the controller (52) serves as, as shown in FIG. 13, a phase detector (526), a first current computation unit (525), a second current computation unit (524), a load current computation unit (523), a current command computation unit (522), a gate plus generator (521), a target setting device (527) that corresponds to a target setting unit, a subtraction device (528), and a time delay unit (529).

The line voltages (Vrs) of the AC power source (4) detected by the voltage detector (46) are input to the phase detector (526). The phase detector (526) detects phases of the power source voltage of the receiving channel (13) using the above line voltages (Vrs), and outputs the phases detected to each of the current computation units (524, 525).

The phases of the power source voltage detected by the phase detector (526), the output current (Irs) of the AC power source (4) detected by the power source-side current detector (7a) in the power factor detector (70), and the power source power factor θαβ computed by the power factor computation device (7d) in the power factor detector (70) are input to the first current computation unit (525). The first current computation unit (525) obtains, based on the above parameters input, a current (considered as a first current command value (i1)) necessary to perform compensation of a harmonic current (reduction in harmonic current) as well as compensation of an idle component of a fundamental wave (improvement to fundamental power factor), and outputs the first current command value (i1) to the load current computation unit (523).

The principle of obtaining the first current command value (i1) is shown in the following formula (11).

[Math. 11]

$$\theta\alpha\beta = \frac{i1 \times \cos\theta_1}{\sqrt{\sum_{n=1}^{\infty}(Irs_n)^2}} \quad (11)$$

The "cos θ1" in the numerator at the right hand side of the above formula (11) means the fundamental power factor. Here, the target value of the power source power factor θαβ is the value "1.0" within the range of "0,9950 to 1.0049". The denominator at the right hand side of the above formula (11) is equal to the effective current value of the output current (Irs) of the AC power source (4), and can thus be computed using the output current (Irs) of the AC power source (4).

Further, the first current command value (i1) is expressed by the following formula (12) that is a variation of the above formula (11).

[Math. 12]

$$i1 = \frac{\theta\alpha\beta}{\cos\theta_1} \times \sqrt{\sum_{n=1}^{\infty}(Irs_n)^2} \quad (12)$$

The formula (12) is changed to the following formula (13) where "cos θ1" is "1.0".

[Math. 13]

$$i1 = \theta\alpha\beta \times \sqrt{\sum_{n=1}^{\infty}(Irs_n)^2} \quad (13)$$

The part of the right hand side of the formula (13) except the power source power factor θαβ is equal to the effective current value of the output current (Irs) of the AC power source (4), as described above. Hence, the first current command value (i1) can be, as can be seen from the formula (13), expressed by the product of the power source power factor θαβ and the effective current value of the output current (Irs).

As described above, the first current computation unit (525) can obtain the first current command value (i1) from the detection results (Irs) of the power source-side current detector (7a), power source power factors 0143 and the phases of the power source voltage.

The phases of the power source voltage detected by the phase detector (526) and the input currents (Ir2a, It2a) input to the current source (30) detected by the filter-side current detectors (45a,45b) in the first air conditioner (11) are input to the second current computation unit (524). The first current computation unit (524) obtains, based on the above parameters, a current (considered as a second current command value (i2)) flowing to the active filter device (5) that performs compensation of a harmonic current (reduction in harmonic current) as well as compensation of an idle component of a fundamental wave (improvement to fundamental power factor) at the present time, and outputs the second current command value (i2) to the load current computation unit (523). For example, the second current computation unit (524) extracts harmonic current components and idle components of the fundamental wave from the detection results (Ir2a, It2a) of the filter-side current detectors (45a, 45b), and outputs them as the second current command value (i2).

The load current computation unit (523) obtains the sum value of the currents input to the harmonic generation load device (3) and the power converters (1,2) that are a generation source of the harmonic current in the air-conditioning system (100) through subtraction of the second current command value (i2) from the first current command value (i1). The computation results thus obtained are output to the current command computation unit (522).

The current command computation unit (522) computes the current value with a phase opposite to the computation results of the load current computation unit (523), and outputs the value thus computed as a current command value (Iref) to the gate pulse generator (521).

The gate pulse generator (521) generates a switching command value (G) commanding switching operation at an inverter circuit constituting the current source (30). The switching command value (G) is a signal to be output to the current source (30) of the first air conditioner (11).

Specifically, the gate pulse generator (521) performs a so-called feedback control in which operations of generating switching command values (G) are repeatedly performed based on deviations between the current values output from the current source (30) of the first air conditioner (11) and the above-mentioned current command value (Iref). Thus, the current source (30) in the first air conditioner (11) supplies a current (compensation current) corresponding to the current command value (Iref) to the receiving channel (13). That is, the gate pulse generator (521) supplies a compensation current to the receiving channel (13). The compensation current is obtained through superimposition of the current corresponding to the first current command value (i1) and the current corresponding to the second current command value (i2).

The target setting device (527) sets the target value of the power source power factor θαβ of the air-conditioning system (100) as a whole, i.e., of the AC power source (4). In the fourth embodiment, the above target value is set within the range of "0.9950 to 1.0049", preferably is the value "1.0". Hereinafter, the case of the above target value "1.0" will be described.

The target value set by the target setting device (527) and the power source power factor θαβ detected by the power factor detector (70) are input to the subtraction device (528). The subtraction device (528) obtains the deviation of the parameters thus input, and outputs the deviation thus obtained to the time delay unit (529).

The above deviation is output to the controller (62) of the active filter device (6) of the second air conditioner (12) as a power factor command value θαβ_AF2 of the active filter device (6). However, the power source power factor θαβ does not have to operate quickly in, for examples, several seconds. A certain amount of necessary time (for example, several minutes) is needed to control the power source power factor θαβ before the capacity of the active filter device (5) reaches the allowable capacity and the current flowing in the active filter device (6) reaches the maximum value of current that may flow.

Hence, the time delay unit (529) sets delay time (for example, several tens of minutes) in view of the above mentioned necessary time. The time delay unit (529) outputs the deviation to the active filter device (6) as the power factor command value (i.e., target value of the power source power factor of the second air conditioner (12)) θαβ_AF2 of the second air conditioner (12) at the time at which a predetermined delay time has passed since a predetermined time (for example, the time at which the above deviation was calculated). That is, the time delay unit (529) delays the start time of the operation of the second active filter device (6) delay so that the operation of the second air conditioner (12) starts to operate after the active filter device (5) of the first air conditioner (11) starts the operation. —Controller (62) Included in the Second Air Conditioner (12)—

Figure 14:
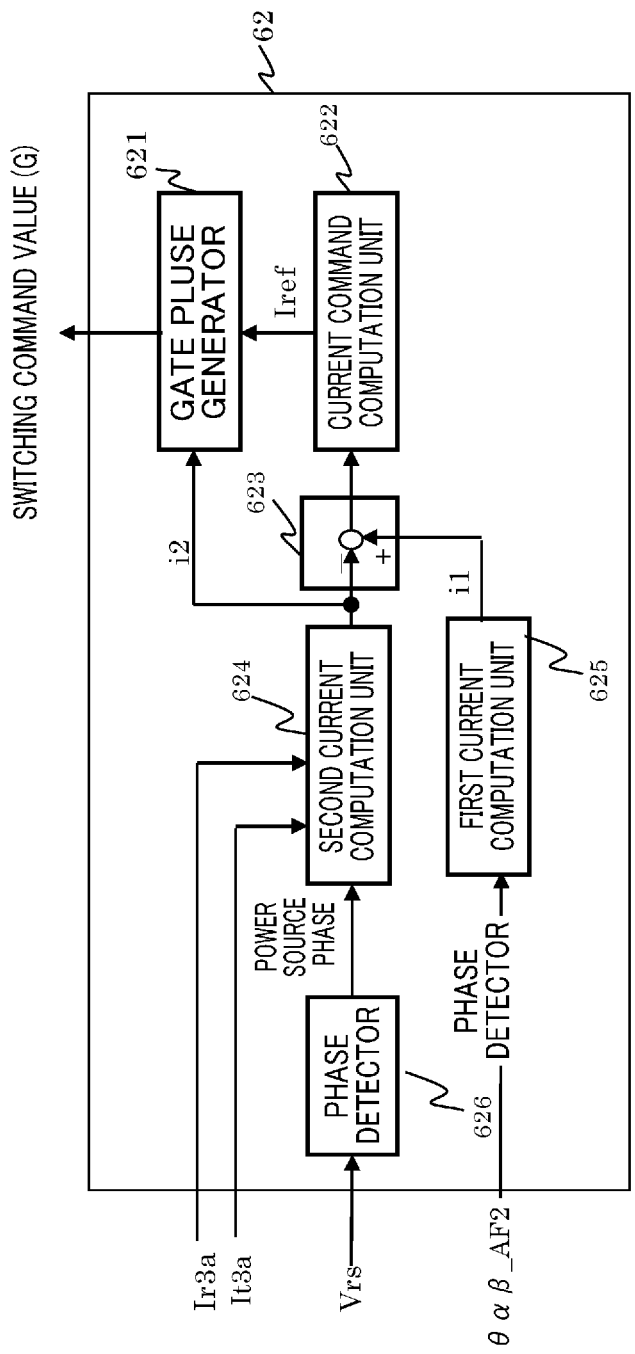
FIG. 14 shows a block diagram illustrating a configuration of a controller in a second active filter device of the fourth embodiment.

Since the program stored in the memory device is implemented by the microcomputer, the controller (62) serves as, as shown in FIG. 14, a phase detector (626), a first current computation unit (625), a second current computation unit (624), a load current computation unit (623), a current command computation unit (622), and a gate plus generator (621).

The operation of the phase detector (626) is identical to the phase detector (526).

The above power factor command value θαβ_AF2 is input to the first current computation unit (625). The first current computation unit (625) obtains, in response to the power factor command value θαβ_AF2, the first current command value (i1) of the active filter device (6). At this time, the following method may be employed: The first current computation unit (625) saves in advance the relationship of the power factor command value θαβ_AF2 and the first current command value (i1) of the active filter device (6) as a table date in which the power factor command value θαβ_AF2 is expressed in the horizontal axis and the first current command value (i1) is expressed in the vertical axis. Then, the power factor command value θαβ_AF2 input is applied to the above table date, thereby uniquely obtaining the first current command value (i1).

The phases of the power source voltage detected by the phase detector (626) and the input currents (Ir3a, It3a) input to the current source (30) detected by the filter-side current detectors (45a,45b) in the second air conditioner (12) are input to the second current computation unit (624). The second current computation unit (624) obtains, based on the above parameters, the second current command value (i2) of the active filter device (5) with the same method as that of the second current computation unit (524).

The load current computation unit (623) obtains the sum value of the currents input to the harmonic generation load device (3) and the power converters (1,2) that are the generation source of a harmonic current in the air-conditioning system (100) through subtraction of the second current command value (i2) that is a computation result of the second current computation unit (624) from the first current command value (i1) that is a computation result of the first current computation unit (625). The computation results thus obtained are output to the current command computation unit (622).

The current command computation unit (622) computes a current value with a phase opposite to the computation results of the load current computation unit (623), and outputs the value thus computed as a current command value (Iref) to the gate pulse generator (621).

The gate pulse generator (621) generates, using the current command value (Iref) that is a computation result output by the gate pulse generator (621), the switching command value (G) to be output to the current source (30) of the air conditioner (12) with the same method as that of the gate pulse generator (521) described above. —Flow of Power Source Quality Improvement Control Operation—

Figure 15:
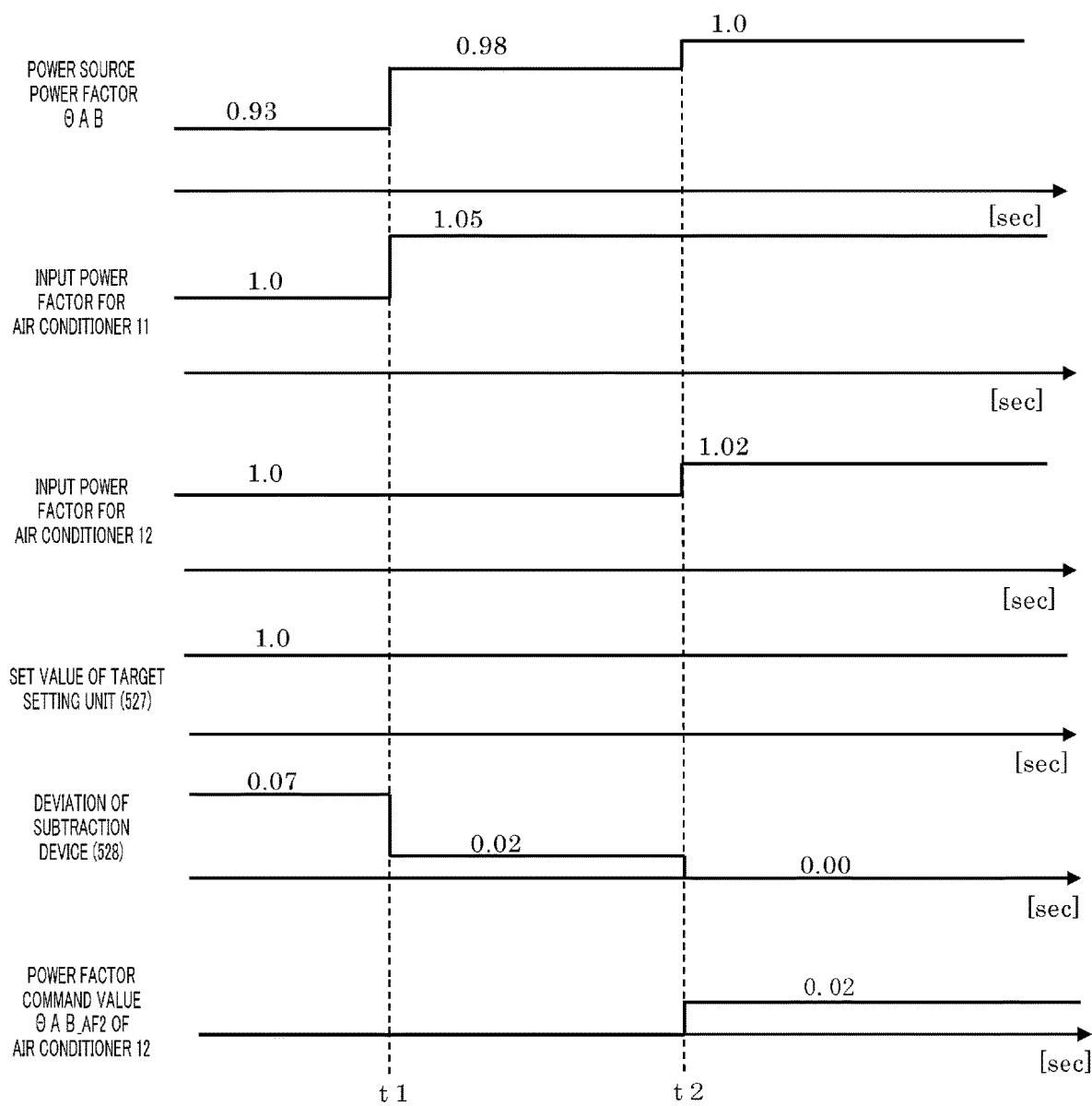
FIG. 15 is a view illustrating one of operations of a power source quality management control of the fourth embodiment in which a power source power factor is a lagging power factor.

FIG. 15 shows operation examples of change over time of the power source power factor θαβ, the input power factor of the first air conditioner (11), the input power factor of the second air conditioner (12), the target value θαβ of the power source power factor set by the target setting device (527), the deviation computed by the subtraction device (528), and the power factor command value θαβ_AF2 for the second air conditioner (12). FIG. 15 shows an operation example in which the power source power factor θαβ is a lagging power factor that is to be corrected.

Note that the following example illustrates the direction of increase and decrease of the power factor in a clarifying manner. It goes without saying that the amount of change of the input power factor of the air conditioners (11,12) for making the power source power factor close to the target value in accordance with the size of the power source current as well as the input current of the air conditioners (11,12).

First, the real power source power factor θαβ is "0.93" until the time t1. The first air conditioner (11) and the second air conditioner (12) each include one of the active filter devices (5,6). Accordingly, each of the input power factors until the time t1 is "1.0".

Note that the set value of the target setting device (527), i.e., the target value of the power source power factor θαβ of the air-conditioning system (100) as a whole, is always "1.0" irrespective of the time.

Until the time t1, the subtraction device (528) obtains a deviation "0.07" through subtraction of the power source power factor θαβ at the present time from the target value "1.0" set by the target setting device (527).

This deviation is not output to the second air conditioner (12) as the power factor command value θαβ_AF2. First, the control for making the power source power factor θαβ close to the target value is performed only through the first air conditioner (11).

At the time t1, the input power factor of the first air conditioner (11) advanced in the leading direction, i.e., changed from "1.0" to "1.05". This is because the power source power factor θαβ prior to the time t1 had been "0.93" which is smaller than the target value of "1.0", i.e., has shifted in the lagging direction. That is, to change the fact that the power source power factor θαβ of the air-conditioning system (100) as a whole is a lagging power factor, the control for changing the input power factor in the leading direction (i.e. the first control) was performed in the first air conditioner (11), so that the input power factor of the first air conditioner (11) has changed in the leading direction, i.e., from "1.0" to "1.05". Through control of the input power factor of the first air conditioner (11), at the time t1, the power source power factor θαβ of the air-conditioning system (100) as a whole has been improved (increased) from "0.93" to "0.98".

However, the power source power factor θαβ of the air-conditioning system (100) as a whole has not reached the target value "1.0" set by the target setting device (527), and remains still in a state of a lagging power factor.

In view of the above, directly after the time t1, the subtraction device (528) obtains a deviation "0.02" between the present power source power factor θαβ "0.98" and the target value "1.0" set by the target setting device (527), outputs the deviation thus obtained as a power factor command value θαβ_FA2 to the second air conditioner (12) at the time t2 after the lapse of a predetermined delay time since the time t1.

As a result, directly after the time t2, to correct the value "0.02" since the power source power factor θαβ of the air-conditioning system (100) as a whole is a lagging power factor, the control for changing the input power factor in the leading direction (i.e. the first control) was performed in the second air conditioner (12), so that the input power factor of the second air conditioner (12) has changed in the leading direction, i.e., from "1.0" to "1.02". Through the control of the input power factor of the second air conditioner (12), at the time t2, the power source power factor θαβ of the air-conditioning system (100) as a whole has been improved (increased) from "0.98 to "1.0", which is the target value of the target setting device (527).

Figure 16:
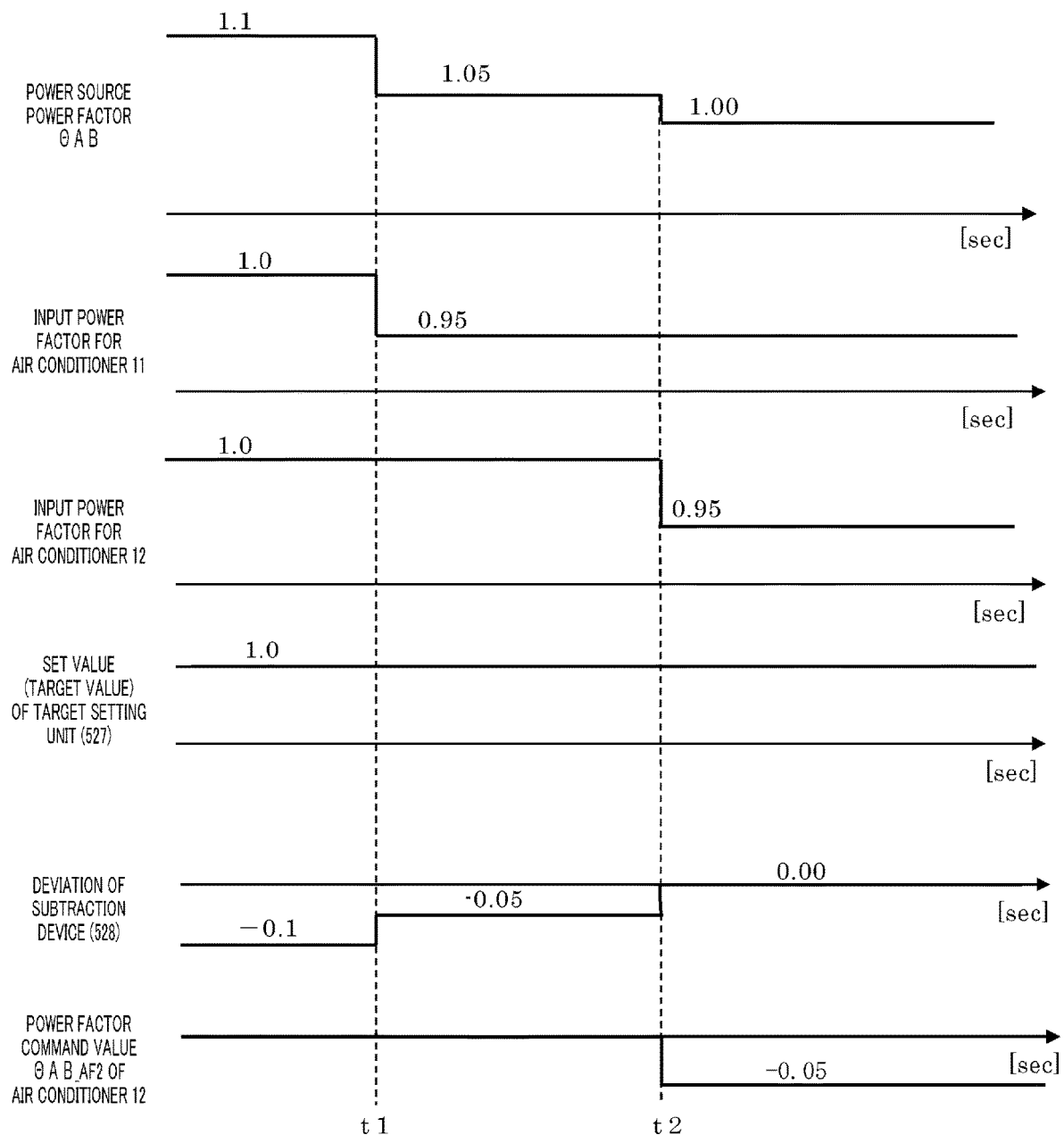
FIG. 16 is a view illustrating one of the operations of the power source quality management control of the fourth embodiment in which the power source power factor is a lagging power factor.

FIG. 16 shows an operation example in which the power source power factor θαβ is a leading power factor that is to be corrected.

First, the real power source power factor θαβ is "1.1" until the time t1. The first air conditioner (11) and the second air conditioner (12) each include one of the active filter devices (5,6). Accordingly, each of the input power factors until the time t1 is "1.0".

Note that the set value of the target setting device (527), i.e., the target value of the power source power factor θαβ of the air-conditioning system (100) as a whole, is always "1.0" irrespective of the time.

Until the time t1, the subtraction device (528) obtains a deviation "−0.1" through subtraction of the power source power factor θαβ at the present time from the target value "1.0" set by the target setting device (527).

This deviation is not output to the second air conditioner (12) as the power factor command value θαβ_AF2. First, the control for making the power source power factor θαβ close to the target value is performed only through the first air conditioner (11).

At the time t1, the input power factor of the first air conditioner (11) has advanced in the lagging direction, i.e., has changed from "1.0" to "0.95". This is because the power source power factor θαβ directly before the time t1 had been "1.1" which is higher than the target value of "1.0", i.e., had shifted in the leading direction. That is, to change the fact that the power source power factor θαβ of the air-conditioning system (100) as a whole is a leading power factor, the control for changing the input power factor in the lagging direction (i.e. the second control) is performed in the first air conditioner (11), so that the input power factor of the first air conditioner (11) has changed in the lagging direction, i.e., from "1.0" to "0.95". Through control of the input power factor of the first air conditioner (11), at the time t1, the power source power factor θαβ of the air-conditioning system (100) as a whole has been improved (decreased) from "1.1" to "1.05".

However, the power source power factor θαβ of the air-conditioning system (100) as a whole has not reached the target value "1.0" set by the target setting device (527), and remains still in a state of a leading power factor.

In view of the above, directly after the time t1, the subtraction device (528) obtains a deviation "−0.05" between the current power source power factor θαβ "1.05" and the target value "1.0" set by the target setting device (527), outputs the deviation thus obtained as a power factor command value θαβ_FA2 to the second air conditioner (12) at the time t2 after the lapse of a predetermined delay time since the time t1.

As a result, directly after the time t2, to correct the value "−0.05" since the power source power factor θαβ of the air-conditioning system (100) as a whole is a leading power factor, the control for changing the input power factor in the lagging direction (i.e. the second control) was performed in the second air conditioner (12), so that the input power factor of the second air conditioner (12) has changed in the leading direction, i.e., from "1.0" to "0.95". Through the control of the input power factor of the second air conditioner (12), at the time t2, the power source power factor θαβ of the air-conditioning system (100) as a whole has been improved (decreased) from "1.05 to "1.0", which is the target value of the target setting device (527).

Note that the operation hours of and the time interval between the time t1 and the time t2 are set by the time delay unit (529).

As thus described above, in the fourth embodiment, at the time of the first and the second controls, the power source quality improvement control is performed as follows: First, the first air conditioner (11) that is considered as a master device performs the control of the input power factor. Then, the second air conditioner (12) that is considered as a slave device performs the control of the input power factor. In the power source quality improvement control, each of the input power factors is made to change so that the power source power factor θαβ approaches the target value "1.0".

Further, in the fourth embodiment, the controller (52) performing the above time management and the command of the power source power factor θαβ of the system (100) as a whole is included in the first air conditioner (11) that is considered as the master device.

<Advantages>

The first control for controlling the power source power factor θαβ is performed, in case of the change of the power source power factor θαβ in the lagging direction, to make an input power factor of at least one of the plural connection devices (41,42) change in the leading direction with respect to the power source power factors θαβ. The second control for controlling the power source power factor θαβ is performed, in case of the change of the power source power factor θαβ in the leading direction, to make an input power factor of at least one of the plural connection devices (41,42) change in the lagging direction with respect to the power source power factors θαβ. Specifically, at the time of the first and the second controls, the power source quality improvement control for improving the power source power factors θαβ is performed to make the input power factor of the second air conditioner (12) change after the change of the input power factor of the first air conditioner (11). In this way, the power source quality including the power source power factor θαβ of the air-conditioning system (100) as a whole can be surely improved.

In the above power source quality improvement control, the control is performed to make the power source power factor θαβ close to the target value. Accordingly, the power source quality of the air-conditioning system (100) as a whole can be surely improved.

In this case, the above target value is set to fall within the range of 0.9950 to 1.0049.

Further, the air conditioners (1,2) include the power converters (1,2) that are generation sources of a harmonic current and the active filter devices (5,6) for improving the power source quality. Though the power source quality management system (100) includes a harmonic generation load device (3) other than the power converters (1,2), the power source quality of the power source quality management system (100) is improved as a whole through the power source quality improvement control.

The power source quality management system (100) further includes a power factor detector (70) for detecting power source power factors. With the power factor detector (70), the power source quality improvement control with higher accuracy can be performed accompanied with the real power source power factors.

Fifth Embodiment

<Configurations>

Figure 17:
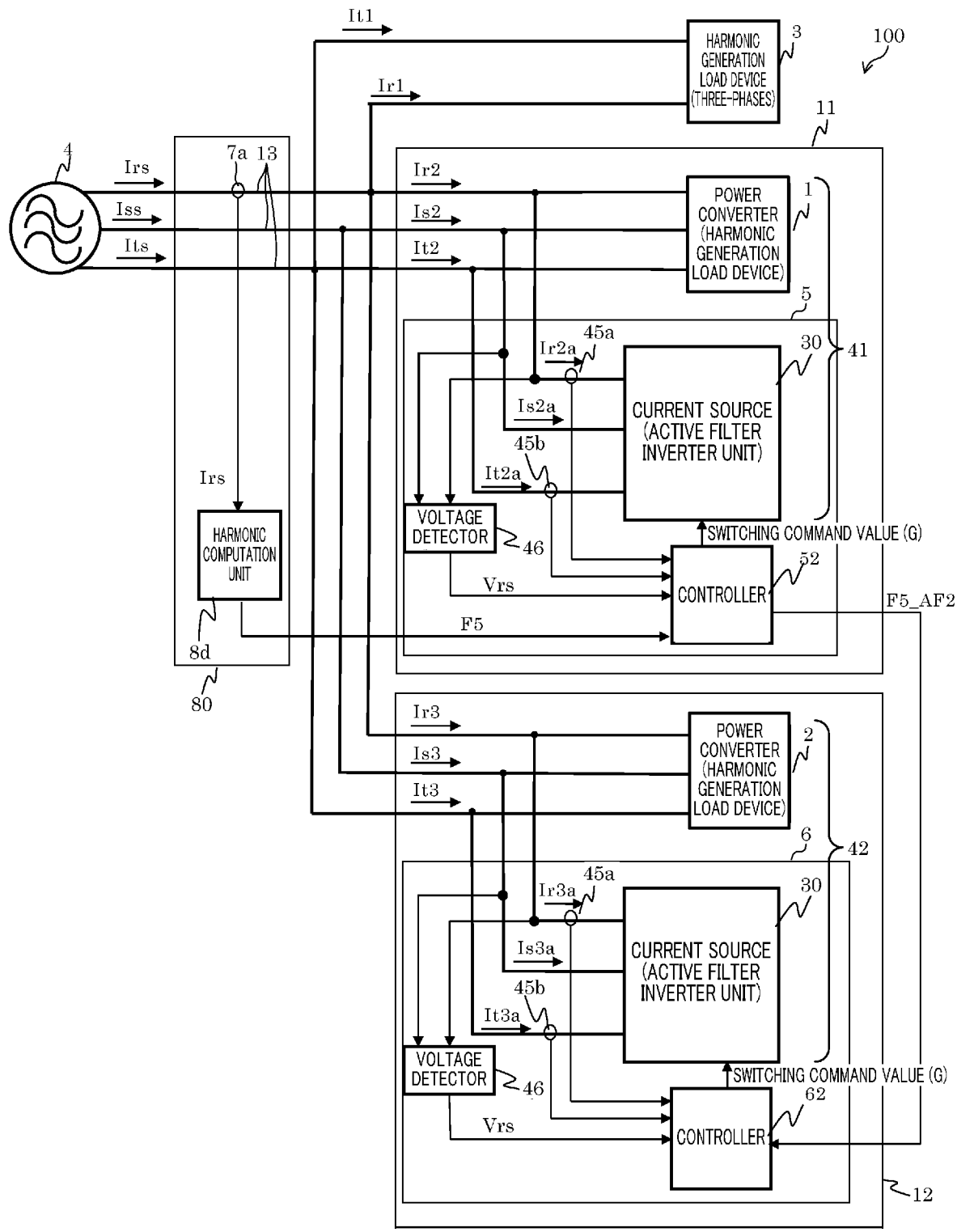
FIG. 17 shows a block diagram illustrating a configuration of an air conditioning system of a fifth embodiment.

FIG. 17 shows a configuration of an air-conditioning system (100) corresponding to a power source quality management system of the fifth embodiment. The point distinguishing the fifth embodiment from the fourth embodiment is the configuration in which, instead of detecting the power source power factor θαβ, a power source harmonic in harmonic current is detected from the power source current (Irs). Hence, in the fourth embodiment, the parameters to be controlled in the power source quality improvement control at the time of the first and the second controls are a harmonic current and an input harmonic, instead of the power source power factor and an input power factor.

Specifically, the air-conditioning system (100) of FIG. 17 includes a harmonic generation load device (3) with a single phase, a plurality of (in this case, two) air conditioners (11,12) including connection devices (41,42), and a power source harmonic detector (80). Like in FIG. 12, each of the air conditioners (11,12) includes the corresponding one of the active filter devices (5,6) and the corresponding one of the power converters (1,2) that are generation sources of harmonic current. Each of the active filter devices (5,6) includes the filter-side current detectors (45a,45b), the corresponding one of the voltage detectors (46), the corresponding one of the current sources (30) and the corresponding one of the controllers (52,62).

The power source harmonic detector (80) includes a power source-side current detector (7a), and a harmonic current computation device (8d). The power source-side current detector (7a) detects the current value (Irs) with the R-phase output from the AC power source (4). The harmonic current computation device (8d) computes, based on the current value (Irs) with the R-phase, for example, the fifth component F5 of a power source harmonic of a harmonic current (in the case of the power source frequency of 50 Hz, the frequency of the fifth component is 250 Hz), and outputs it to the controller (52).

Although not shown, the detailed configuration of the controller (52) of this embodiment is similar to that of the fourth embodiment of FIG. 13 except that the current value (Irs) is not input and that the fifth component F5 of power source harmonic is input instead of the power source power factor θαβ. Note that the target setting device (527) sets, instead of the target value of the power source power factor θαβ, the target value of the harmonic current, in particular, the target value of the fifth component of the power source harmonic of the harmonic current. The time delay unit (529) outputs, instead of the power factor command value θαβ_AF2, the command value F5_AF2 of the power source harmonic of the harmonic current (hereinafter, called a harmonic command value) to the second air conditioner (12).

The detailed configuration of the controller (62) is similar to that of FIG. 14.

<Flow of Power Source Quality Improvement Control Operation>

The controllers (52,62) in the respective air conditioners (11,12) of the fifth embodiment perform, in the first and the second controls, adjustment of the input harmonic of the air conditioners (11,12) through adjustment of the output current from the current sources (30), thereby controlling the power source harmonic of the harmonic current, so as to perform power source quality improvement control for indirectly controlling the power factors. The detailed power source quality improvement control is as follows: Based on the harmonic current, an input harmonic of the first air conditioner (11) that is one of the plural air conditioners (11,12) is changed. Then, the input harmonic is changed for the second air conditioner (12) that is the rest of the plural air conditioners (1,2) except the first air conditioner (11).

Note that the following example illustrates the direction of an increase and a decrease in the harmonic current in a clarifying manner. It goes without saying that a phase shifting due to wiring impedance between the AC power source (4) and the air conditioners (11,12) is also taken into consideration for the purpose of making the power source harmonic close to the target value.

To achieve the above power source quality improvement control, in the fifth embodiment, the controller (52) performs adjustment of the input harmonic for the air conditioner (11) in which the controller (52) is included. Then, the controller (62) performs adjustment of the input harmonic for the air conditioner (12) in which the controller (62) is included.

Figure 18:
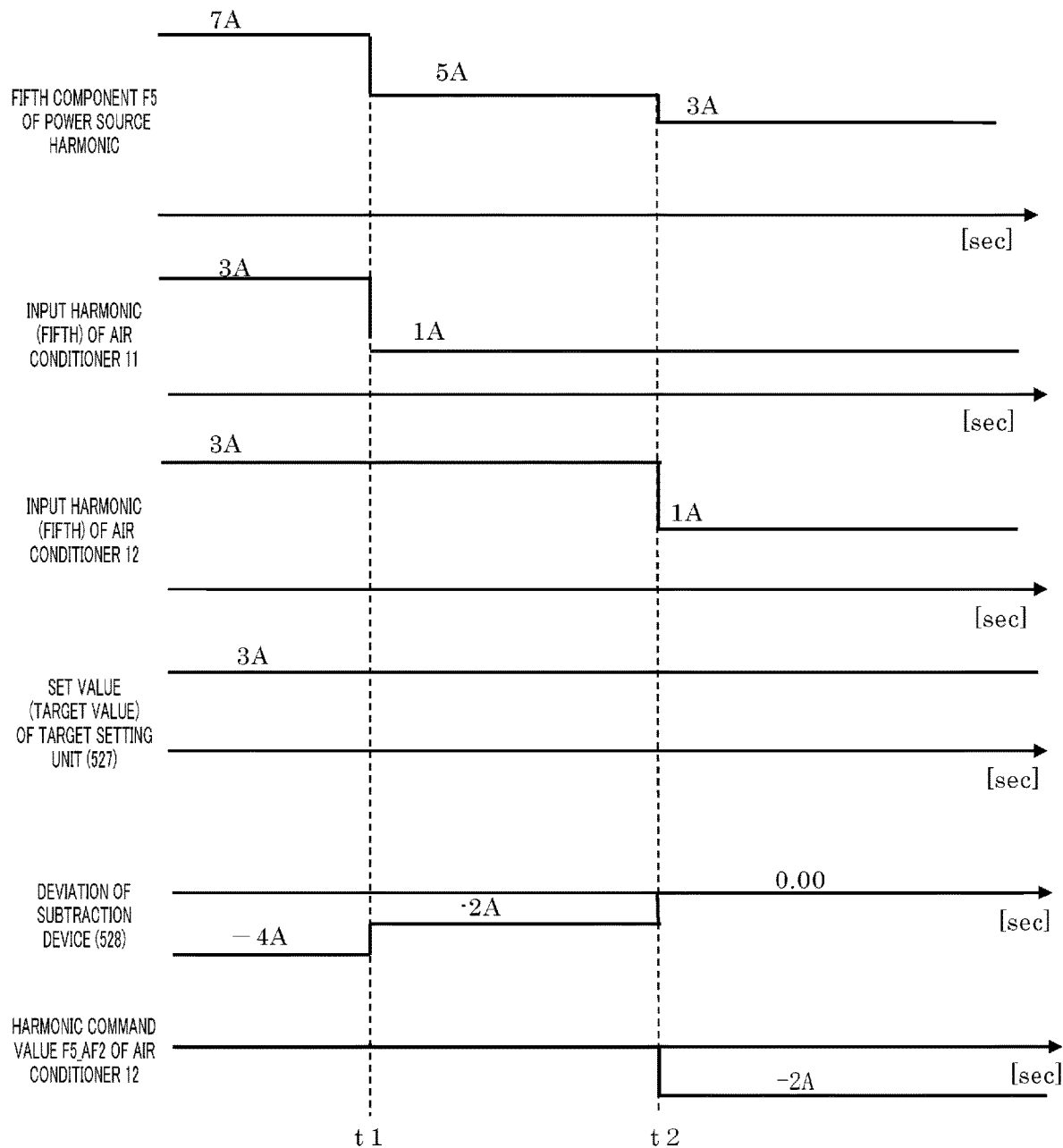
FIG. 18 is a view illustrating one of operations of a power source quality management control of the fifth embodiment in which a power source power factor is a lagging power factor.

FIG. 18 shows operation examples of change over time of the fifth component F5 of the power source harmonic of the harmonic current, the input harmonic (fifth component) of the first air conditioner (11), the input harmonic (fifth component) of the second air conditioner (12), the target value of the fifth component of the power source harmonic set by the target setting device (527), the deviation computed by the subtraction device (528), and the harmonic command value F5_AF2 for the second air conditioner (12).

First, until the time t1, the fifth component F5 of the power source harmonic of the real harmonic current is "7A". The first air conditioner (11) and the second air conditioner (12) each include one of the active filter devices (5,6). Accordingly, each of the input harmonics until the time t1 is "3A".

Note that the set value of the target setting device (527), i.e., the target value of the fifth component of the power source harmonic of the air-conditioning system (100) as a whole is always "3A", irrespective of the time.

Until the time t1, the subtraction device (528) obtains a deviation "−4A" through subtraction of the fifth component F5 of the power source harmonic at the present time from the target value of "3A" set by the target setting device (527). This deviation is not output to the second air conditioner (12) as the harmonic command value F5 AF2. First, control for making the fifth component F5 of the power source harmonic close to the target value is performed only through the first air conditioner (11).

At the time t1, the input harmonic of the first air conditioner (11) has decreased to "1A". This is because the fifth component F5 of the power source harmonic before the time t1 was "7A" which is higher than the target value of "3A", i.e., has shifted in the lagging direction of the power source power factor of the AC power source (4). As the power source harmonic increases, the power source power factor decreases. On the contrary, as the power source power factor decreases, the power source power factor increases. Hence, it can be apparent from the fifth component F5 of the power source harmonic until the time t1 that the power source power factor of the air-conditioning system (100) as a whole is in a state of the lagging power factor. To correct this state, at the time t1, the air conditioner (11) changes the input harmonic in the direction in which it decreases, thereby performing a control equivalent to making the input power factor precede the power source power factor (i.e., the first control). As a result, the input harmonic in the air conditioner (11) decreases from "3A" to "1A". Through this control of the input harmonic of the first air conditioner (11), at the time t1, the fifth component of the power source harmonic of the air-conditioning system (100) as a whole has been improved (decreased) from "7A" to "5A". This means that the power source power factor of the air-conditioning system (100) as a whole has changed its direction to a leading direction, i.e., has been improved (increased).

However, the power source harmonic of the air-conditioning system (100) as a whole has not reached the target value "3A" set by the target setting device (527), and remains still in a state of a lagging power factor.

In view of the above, directly after the time t1, the subtraction device (528) obtains a deviation "−2A" between the fifth component F5 "5A" of the current power source harmonic and the target value "3A" set by the target setting device (527), outputs the deviation thus obtained as a harmonic command value F5 AF2 to the second air conditioner (12) at the time t2 after the lapse of a predetermined delay time since the time t1.

As a result, directly after the time t2, to correct "−2A" for the difference from the target value due to the lagging state of the fifth component F5 of the power source harmonic of harmonic current of the air-conditioning system (100), the second air conditioner (12) changes the direction of the input harmonic to a direction in which the input harmonic decreases, thereby performing a control equivalent to making the input power factor precede the power source power factor (i.e., the first control). As a result, directly after the time t2, the input harmonic of the second air conditioner (12) decreases from "3A" to "1A". Through this control of the input power factor of the second air conditioner (12), at the time t2, the fifth component of the power source harmonic of the air-conditioning system (100) as a whole has been improved (decreased) from "5A to "3A", which is the target value of the target setting device (527).

Note that the operation hours of and the time interval between the time t1 and the time t2 are set by the time delay unit (529) of the controller (52).

As thus described above, in the fifth embodiment, at the time of the first and the second controls, the power source quality improvement control is performed as follows: First, the first air conditioner (11) that is considered as a master device performs the control of the input harmonic. Then, the second air conditioner (12) that is considered as a slave device performs the control of the input harmonic. In this power source quality improvement control, the respective harmonics are changed so that the harmonic current approaches the target value. Accordingly, the harmonic current is reduced, resulting in indirect improvement of the power source power factor of the air-conditioning system (100) as a whole.

Further, in the fifth embodiment, the controller (52) performing the above time management and the command of the fifth component F5 of the power source harmonic of the system (100) as a whole is included in the first air conditioner (11) that is considered as the master device.

Note that the description of concrete examples of the leading power factor is omitted.

<Advantages>

When the power source power factor changes in the lagging direction, the first control for controlling the power source harmonic of the harmonic current is performed so that the input power factor of inputs of at least one of the connection devices (41,42) is made to precede the power source power factor. When the power source power factor changes in the lagging direction, the second control for controlling the power source harmonic of the harmonic current is performed so that the input power factor of inputs of at least one of the connection devices (41,42) is made to lag behind the power source power factor. Specifically, at the time of the first and the second controls, based on the harmonic current, the power source quality improvement control is performed to make the input harmonic of the second harmonic current (12) change after the change of the input harmonic of the first air conditioner (11). In this way, the harmonic current is reduced, resulting in improvement of the power source power factor. Accordingly, the power source quality of the air-conditioning system (100) as a whole can be surely improved.

In the above power source quality improvement control, the control is performed to make the harmonic current close to the target value. Accordingly, the power source quality of the air-conditioning system (100) as a whole can be surely improved.

Further, the air conditioners (1,2) include the power converters (1,2) that are generation sources of the harmonic current and the active filter devices (5,6) for improving the power source quality. Though the power source quality management system (100) includes a harmonic generation device (3) other than the power converters (1,2), the power source quality of the power source quality management system (100) is improved as a whole through the power source quality improvement control.

Sixth Embodiment

<Configurations>

Figure 19:
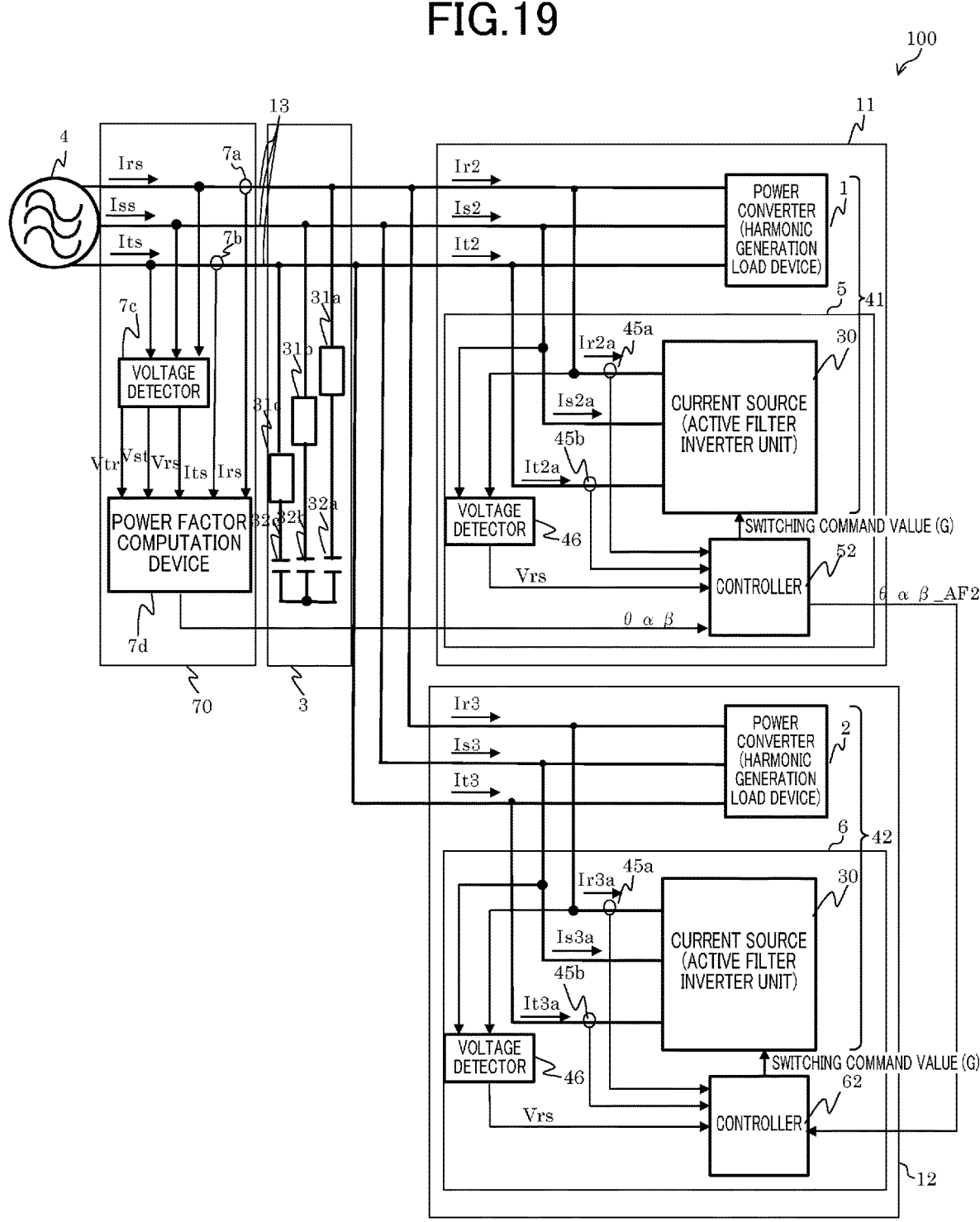
FIG. 19 shows a block diagram illustrating a configuration of an air conditioning system of a sixth embodiment.

FIG. 19 shows a configuration of an air-conditioning system (100) corresponding to a power source quality management system of the sixth embodiment. The sixth embodiment differs from the fourth embodiment in that the harmonic generation load device (3) is constituted by a phase modifier. Another difference of the sixth embodiment from the fourth embodiment is as follows: When the power source power factor θαβ cannot be controlled by using the active filter devices (5,6), the operation of at least one of the active filter devices (5,6) is stopped to perform operation for making the power source power factor θαβ close to the target value "1.0". The command of operation stop is as follows: The air-conditioning device (5) in the first air conditioner (11) that is a master device, and the air-conditioning device (6) that is a slave device. The other points are substantially the same as, or similar to, those of the fourth embodiment.

Specifically, the air-conditioning system (100) of FIG. 19 includes a harmonic generation load device (3) that is a phase modifier, a plurality of (in this case, two) air conditioners (11,12) including connection devices (41,42), and a power factor detector (70). Like in FIG. 12, each of the air conditioners (11,12) includes the corresponding one of the active filter devices (5,6) and the corresponding one of the power converters (1,2) that are generation sources of a harmonic current. Like in FIG. 12, each of the active filter devices (5,6) includes the filter-side current detectors (45a, 45b), the corresponding one of the voltage detector (46), the corresponding one of the current sources (30) and the corresponding one of the controllers (52,62).

The harmonic generation load device (3) is connected between the power factor detector (70) and the air conditioners (11,12), and includes three phase-advancing reactors (31a,31b,31c) and three phase advancing-capacitors (32a, 32b,32c) corresponding with the respective phases of the AC power source (4).

The harmonic generation load device (3) is designed such that the power source power factor θαβ is "1.0" that is the target value when the first air conditioner (11) and the second air conditioner (12) respectively operate with their maximum electric power. Hence, when the respective air conditioners (11,12) operate with an electric power lower than the maximum electric power, the power source power factor θαβ becomes a leading power factor. Accordingly, when the power source power factor θαβ is a leading power factor, the active filter devices (5,6) may be beyond the controllable range. In view of the above, when the power source power factor θαβ is a leading power factor, the control for stopping the operation of the active filter devices (5,6) is performed.

Note that the other points of the detailed configuration of the air-conditioning system (100) are similar to those of the fourth embodiment.

<Flow of Power Source Quality Improvement Control Operation>

Like in the fourth embodiment, the controllers (52,62) in the respective air conditioners (11,12) of the sixth embodiment performs, as the first and the second controls, adjustment of the input power factors of the air conditioners (11,12) through adjustment of the output current from the current sources (30), thereby performing power source quality improvement control for controlling the power factors. To achieve the above power source quality improvement control, the controller (52) performs adjustment of the input power factors for the air conditioner (11) in which the controller (52) is included. Then, the controller (62) performs adjustment of the input power factors for the air conditioner (12) in which the controller (62) is included.

Figure 20:
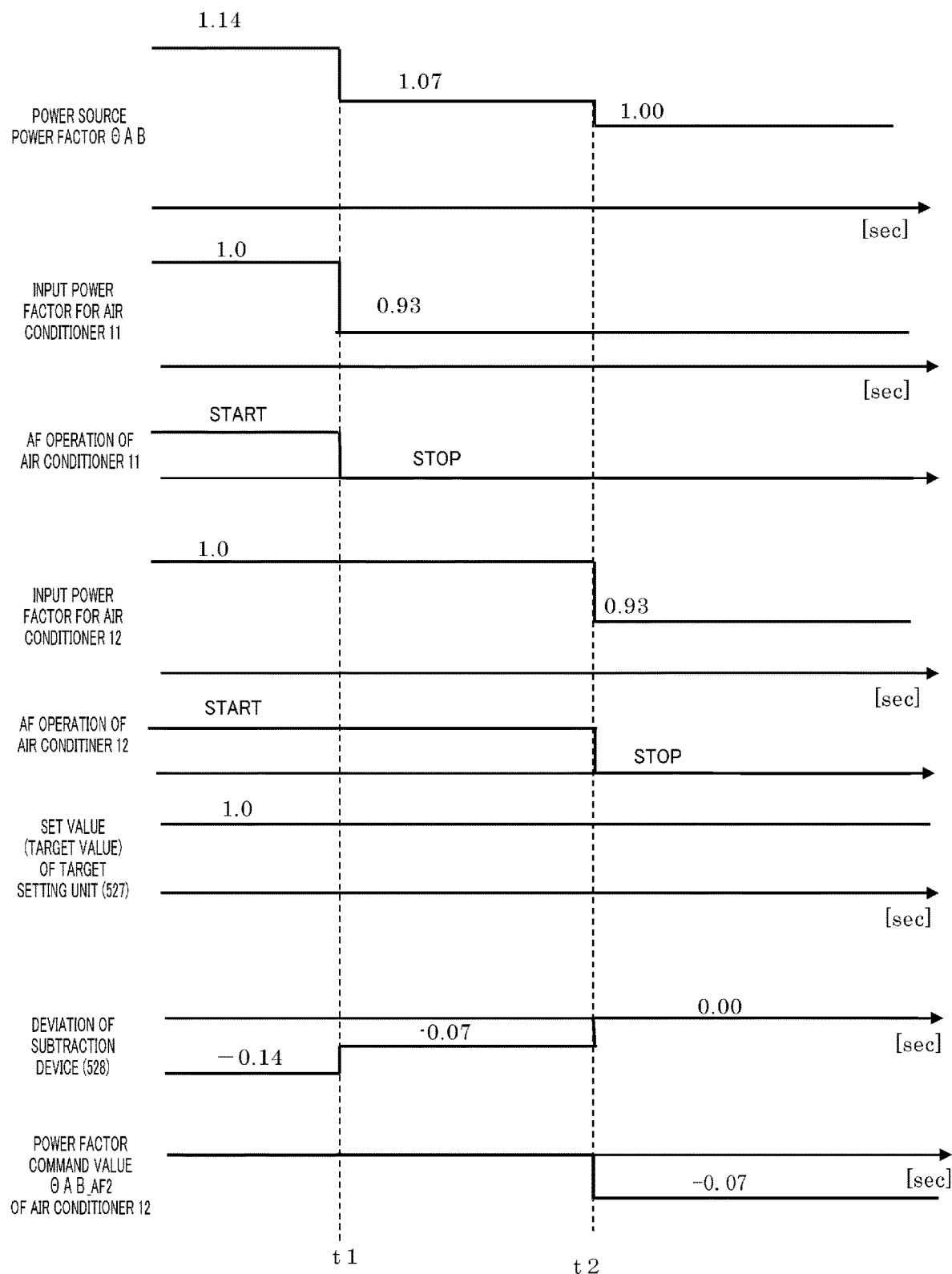
FIG. 20 is a view illustrating one of operations of a power source quality management control of the sixth embodiment in which a power source power factor is a leading power factor.

Further, in the sixth embodiment, as shown in FIG. 20, when the power source power factor θαβ is a leading power factor, the control is performed to sequentially stop the operations of the active filter devices (5,6) in accordance with the leading state of the leading power factor.

FIG. 20 shows operation examples of change over time of the power source power factor θαβ, the input power factor of the first air conditioner (11), the operation of the active filter device (5) of the first air conditioner (11), the input power factor of the second air conditioner (12), the operation of the active filter device (6) of the second air conditioner (12), the target value θαβ of the power source power factor set by the target setting device (527), the deviation computed by the subtraction device (528), and the power factor command value θαβ_AF2 for the second air conditioner (12). FIG. 20 shows an operation example in which the power source power factor θαβ is a leading power factor that is to be corrected.

First, the real power source power factor θαβ is "1.14" until the time t1. The respective active filter devices (5,6) of the first air conditioner (11) and the second air conditioner (12) have started, each of the input power factors until the time t1 being "1.0".

Note that the set value of the target setting device (527), i.e., the target value of the power source power factor θαβ of the air-conditioning system (100) as a whole, is always "1.0" irrespective of the time.

Until the time t1, the subtraction device (528) obtains a deviation "−0.14" through subtraction of the power source power factor θαβ at the present time from the target value "1.0" set by the target setting device (527).

This deviation is not output to the second air conditioner (12) as the power factor command value θαβ_AF2. First, the control for making the power source power factor θαβ close to the target value is performed through stopping the active filter device (5) of the first air conditioner (11).

At the time t1, the input power factor of the first air conditioner (11) has advanced in the lagging direction, i.e., has changed from "1.0" to "0.93". This is because the power source power factor θαβ directly before the time t1 was "1.14" which is higher than the target value "1.0", i.e., has shifted in the leading direction. That is, to correct the fact that the power source power factor 0143 of the air-conditioning system (100) as a whole is a leading power factor, the control for stopping the operation of the active filter device (5) (i.e., the second control) is performed in the first air conditioner (11) to change the input power factor in the lagging direction. As a result, the input power factor of the first air conditioner (11) has changed in the lagging direction, i.e., from "1.0" to "0.93". Through this control of the input power factor of the first air conditioner (11), at the time t1, the power source power factor 0143 of the air-conditioning system (100) as a whole has been improved (decreased) from "1.14" to "1.07".

Note that the control for stopping the operation of the active filter device (5) may include, for example, making the controller (52) output the switching command value (G) for stopping the operation of the current source (30) to the current source (30).

However, the power source power factor 0143 of the air-conditioning system (100) as a whole has not reached the target value "1.0" set by the target setting device (527), and remains still in a state of a leading power factor.

Directly after the time t1, the subtraction device (528) obtains a deviation "−0.07" between the current power source power factor θαβ "1.07" and the target value "1.0" set by the target setting device (527), outputs the deviation thus obtained as a power factor command value θαβ_FA2 to the second air conditioner (12) at the time t2 after the lapse of a predetermined delay time since the time t1.

As a result, to correct the fact that the value "−0.07" for the power source power factor θαβ of the air-conditioning system (100) as a whole is a leading power factor, the control for stopping the operation of the active filter device (6) (i.e. the second control) is performed in the second air conditioner (12) to change the input power factor in the lagging direction. As a result, the input power factor of the second air conditioner (12) has changed in the lagging direction, i.e., from "1.0" to "0.93". Through this control of the input power factor of the second air conditioner (12), at the time t2, the power source power factor θαβ of the air-conditioning system (100) as a whole has been improved (decreased) from "1.07 to "1.0", which is the target value of the target setting device (527).

Note that the operation hours of and the time interval between the time t1 and the time t2 are set by the time delay unit (529) of the controller (52).

As thus described above, in the sixth embodiment, at the time of the first and the second controls, the power source quality improvement control is performed as follows: First, the first air conditioner (11) that is considered as a master device performs the control of the input power factor (specifically, the control for stopping the operation of the active filter device (5)). Then, the second air conditioner (12) that is considered as a slave device performs the control of the input power factor (specifically, the control for stopping the operation of the active filter device (6)). In the power source quality improvement control, each of the input power factors is made to change so that the power source power factor θαβ approaches the target value "1.0".

Further, in the sixth embodiment, the controller (52) performing the above time management and the command of the power source power factor θαβ of the system (100) as a whole is included in the first air conditioner (11) that is considered as the master device.

<Advantages>

This embodiment has effects described below, in addition to those in the above fourth embodiment.

In the power source quality improvement control of the second control, the controller (52) stops the operation of the active filter device (5) included in the first air conditioner (11). When the operation of the active filter device (5) is stopped, the power source quality improvement control is accordingly not performed, resulting in drop of the power source power factor θαβ. Hence, when the power source power factor of the AC power source (4) changes in the leading direction, the power source power factor decreases and is thus improved through stop of the operation of the active filter device (5) at the second control.

Further, in the power source quality improvement control of the second control, the controller (52) stops the operation of the active filter device (6) included in the second air conditioner (12) when the power source power factor θαβ after the stop of the active filter device (5) included in the first air conditioner (11) still changes in the leading direction. As a result, the power source factor further decreases and is thus be improved.

Further, the controller (52) is integrated in the active filter device (5) included in the first air conditioner (11). That is, in this case, the controller (52) that plays a commanding role of the power source quality improvement control is included in the air conditioner (11) in which also the active filter device (5) is included, whose operation stops in advance.

The load device (3) is a phase modifier including condensers (32a to 32c) and reactors (31a to 31c). As thus described above, with the phase modifier included in the system (100), the power source power factor θαβ is likely to change in the leading direction. In this case, through the power source quality improvement control in the second control, the power source power factor changes in the lagging direction, resulting in improvement of the power source quality.

Other Embodiments

The active filter devices (5,6) of the first to the sixth embodiments may only have a function for reducing a harmonic current. Further, the active filter devices (5,6) may only have a function for improving power factors.

In the above first to the sixth embodiments, the one air conditioner (11,12) may include a plurality of active filter devices (5,6).

In the above first to the sixth embodiments, it is not necessary that the active filter devices (5,6) are integrated in the air conditioners (11,12).

In the first to the sixth embodiments, the number of the air conditioners (11,12) is not limited to two, but may be any number greater than two.

In the first to the sixth embodiments, for convenience of explanation, the case of the power source power factor as leading power factor and the case of the power source power factor as lagging power factor have been described as concrete examples. However, the first to the sixth embodiments may also be applicable to the case in which the power source power factor may change from the leading direction to the lagging direction or vice versa over course of time.

In the first to the third embodiments, the case in which the harmonic generation load device in the air conditioners (11,12) is the power converters (1,2) has been described. However, the harmonic generation load device in the air conditioners (11,12) is not limited to the power converters.

According to the description made in connection with the first to the third embodiments, the larger the surplus amount is, the larger the compensation amount to be distributed to the active filter devices (5,6) becomes. However, this is not necessarily so. It is sufficient when the compensation amount of the harmonic generation load device (3) is distributed to each of the active filter devices (5,6) under the condition in which the compensation amount of the current source (30) of the corresponding one of the active filter devices (5,6) does not exceed the maximum output capacity of the current source (30).

In the fourth to the sixth embodiments, the target value does not have to fall within the range of "0.9950 to 1.0049", but may be appropriately determined in accordance with installation environment of the power source quality management system (100) etc.

In the fourth to the sixth embodiments, the power source power factor $\theta\alpha\beta$ falling within the range of "0.9950 to 1.0049" can be equal to the target value "1.0" through rounding-off. Then, when the power source power factor $\theta\alpha\beta$ falls within the range of "0.9950 to 1.0049", it may be determined that the power source power factor $\theta\alpha\beta$ substantially reaches the target value, thereby omitting the above-mentioned control of the input power factor.

According to the description in connection with the above fourth to the sixth embodiments, the controller (52) that plays a commanding role of the power source quality improvement control is integrated in the first air conditioner (11) that can be considered as a master device. However, the position of the controller (52) is not limited thereto. The controller (52) may be in the second air conditioner (12) that is a slave device, or may be located apart from the first and the second air conditioners (11,12).

In the fourth and the sixth embodiments, the position of the power factor detector (70) is not limited to the positions illustrated in FIG. 12 and FIG. 19. In the fourth and the sixth embodiments, it is sufficient when the power source power factor 04 is checked. The method of checking the power source power factor $\theta\alpha\beta$ is not limited to the methods of detection described in the fourth and the sixth embodiments.

In the fifth embodiment, the position of the power source harmonic detector (80) is not limited to the position illustrated in FIG. 17. Further, in the fifth embodiment, it is sufficient when the power source harmonic F5 is checked. The method of checking the power source harmonic F5 is not limited to the detection method described in the fifth embodiment.

In the fifth embodiment, the case in which the power source harmonic is the fifth component has been exemplarily described. However, the power source harmonic is not limited to the fifth component.

In the sixth embodiment, when the power source power factor $\theta\alpha\beta$ approximately reaches the target value through stopping the operation of the first air conditioner (11), the operation of the second air conditioner (12) does not have to be stopped. The second air conditioner (12) may operate to the extent that changes the input power factor to be closer to the target value.

In the sixth embodiment, the case in which the harmonic generation load device (3) is a phase modifier has been described. However, the harmonic generation load device (3) is not limited thereto. Further, in the first to the sixth embodiments, the harmonic generation load device (3) may be a phase modifier.

In the sixth embodiment, instead of the control for changing the input power factor, the control for changing the input harmonic as described in the fifth embodiment may be performed.

In the first to the sixth embodiments, for a phase modifier using a condenser in which the amount of change of the power factor of the harmonic generation load device (3) is predicable, the air conditioners (11,12) may be used for which the power factor command value $\theta\alpha\beta\_AF2$ can be set from outside. Through the change of the power factor command value $\theta\alpha\beta\_AF2$ of the air conditioners (11,12) in accordance with the harmonic generation load device (3), it is also possible to omit the power factor detector. In this case, however, it should be noted that a detector of an input current of the power converters (1,2) or the air conditioners (11,12) is needed.

INDUSTRIAL APPLICABILITY

As can be seen from the foregoing description, the present invention is useful for a power source quality management system and an air-conditioning device.

DESCRIPTION OF REFERENCE CHARACTERS

100 Air-conditioning System (Power Source Management System)
1,2 Power Converter (Harmonic Generation Device)
3 Harmonic Generation Load Device (Load Device)
4 AC Power Source
5,6 Active Filter Device
11,12 Air Conditioner
30 Power Source
31a to 31c Reactor
32a to 32c Capacitor
41,42 Connection Device
43,47,52,62 Controller
70 Power Factor Detector (Power Factor Detection Unit)
90 Calculation Unit
526 Target Setting Device (Target Setting Unit)

The invention claimed is:
1. A power source quality management system, comprising:
    a load device that is connected to a power source and supplied with a power source electric power from the power source;

a plurality of connection devices, each including a harmonic generation device that is parallelly connected to the load device with respect to the power source and supplied with the power source electric power from the power source, and a current source whose output is parallelly connected to the harmonic generation device with respect to the power source; and a controller configured to control a harmonic current flowing in a receiving channel from the power source to the load device and the harmonic generation devices or to control a power source power factor of the power source, the controller being configured to:

perform a first control for controlling the power source power factor or a power source harmonic of the harmonic current such that an input power factor of at least one of the connection devices changes in a direction preceding the power source power factor in a case where the power source power factor changes in a lagging direction, and perform a second control for controlling the power source power factor or the power source harmonic such that the input power factor of at least one of the connection devices changes in a direction lagging behind the power source power factor in a case where the power source power factor changes in the leading direction.

2. The power source quality management system of claim 1, wherein each of the current sources is able to generate a compensation current for performing at least one of reduction in harmonic current and improvement in a fundamental power factor of a corresponding one of the harmonic generation devices and the load device, a calculation unit is further included, wherein, at a time of the first control and the second control performed by the controller, to make a sum of the harmonic current generated in the plurality of the harmonic generation devices and in the load device distributed among and compensated by the current sources and make a compensation amount of each of the current sources meet the condition of less than a maximum output capacity of each of the current sources, the calculation unit calculates an amount of the compensation current corresponding to the compensation amount to be generated by the corresponding one of the current sources, and the controller performs, based on a calculation result of the calculation unit (90), the first control and the second control.

3. The power source quality management system of claim 2, wherein the calculation unit calculates a first compensation amount, based on which each of the current sources compensates the harmonic current generated in part of the harmonic generation devices and the load device, calculates a surplus amount for each of the current sources, the surplus amount being a difference between the maximum output capacity and the first compensation amount, and calculates the compensation current of each of the current sources in accordance with the surplus amount.

4. The power source quality management system of claim 3, wherein the calculation unit calculates the compensation current of each of the current sources such that a second compensation amount increases as the surplus amount increases, the second compensation amount being used for making a sum of the harmonic current generated in a rest of the harmonic generation devices and the load device except for the part of the harmonic generation devices and the load device distributed and compensated.

5. The power source quality management system of claim 4, wherein the maximum output capacity is a maximum compensation current value indicating a maximum value of a current that can be generated by each of the current sources, and the calculation unit calculates the surplus amount through subtraction of a current value of a first compensation corresponding to the first compensation amount from the maximum compensation current value.

6. The power source quality management system of claim 4, wherein the maximum output capacity is a maximum compensation electric power value indicating a maximum value of electric power that can be generated by each of the current sources, and the calculation unit calculates the surplus amount through subtraction of an electric power value of a first compensation corresponding to the first compensation amount from the maximum compensation electric power value.

7. The power source quality management system of claim 2, wherein the power source is an AC power source, and at least one of the harmonic generation devices is a power converter that is supplied with electric power from the power source.

8. An active filter device included in the power source quality management system of claim 2, the active filter device being connected to the power source, the load device, and the harmonic generation device, comprising:

the current source; and the controller in which the calculation unit is integrated.

9. An air conditioner, comprising the air-conditioning device of claim 8.

10. The power source quality management system of claim 1, wherein, the plurality of connection devices are respectively included in air conditioners, and the controller performs, in the first control and the second control, based on the harmonic current or the power source power factor, change of the input power factor or an input harmonic of the first air conditioner that is a part of the air conditioners to reduce the harmonic current or to make improvement through increase or decrease of the power source power factor, then changes an input power factor or an input harmonic of the second air conditioner that is a rest of the air conditioners except for the first air conditioner, to perform a power source quality improvement control for controlling the power source power factor or the power source harmonic.

11. The power source quality management system of claim 10, further comprising a target setting unit configured to set a target value of the harmonic current or of the power source power factor, wherein the controller changes, in the power source quality improvement control, the harmonic current or the power source power factor to be close to the target value.

12. The power source quality management system of claim 11, wherein
the target value is set to fall within a range of 0.9950 to 1.0049.

13. The power source quality management system of claim 10, wherein
each of the air conditioners includes a power converter that is the harmonic generation device, and an active filter device that includes the current source and is connected to the power converter.

14. The power source quality management system of claim 13, wherein
the controller stops, in the power source quality improvement control of the second control, an operation of the active filter device included in the first air conditioner.

15. The power source quality management system of claim 14, wherein
the controller stops, in the power source quality improvement control of the second control, an operation of the active filter device included in the second air conditioner when the power source power factor after the stop of the active filter device included in the first air conditioner still changes in a leading direction.

16. The power source quality management system of claim 13, wherein
the controller is integrated in the active filter device included in the first air conditioner.

17. The power source quality management system of claim 10, wherein
the load device is a phase modifier including a capacitor and a reactor.

18. The power source quality management system of claim 10, further comprising
a power factor detection unit that is connected between the power source and the air conditioner and configured to detect the power source power factor.

* * * * *